United States Patent
Song et al.

(10) Patent No.: US 9,957,337 B2
(45) Date of Patent: *May 1, 2018

(54) METHOD FOR PREPARING POLYOLEFIN AND POLYOLEFIN PREPARED THEREBY

(71) Applicant: LG CHEM, LTD., Seoul (KR)

(72) Inventors: Eun Kyoung Song, Daejeon (KR); Heon Yong Kwon, Daejeon (KR); Hyuck Ju Kwon, Daejeon (KR); Yong Ho Lee, Daejeon (KR); Yi Young Choi, Daejeon (KR); Dae Sik Hong, Daejeon (KR); Ki Soo Lee, Daejeon (KR); Kyung Jin Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/303,437

(22) PCT Filed: Jun. 3, 2015

(86) PCT No.: PCT/KR2015/005580
§ 371 (c)(1),
(2) Date: Oct. 11, 2016

(87) PCT Pub. No.: WO2015/186970
PCT Pub. Date: Dec. 10, 2015

(65) Prior Publication Data
US 2017/0029538 A1    Feb. 2, 2017

(30) Foreign Application Priority Data

Jun. 3, 2014   (KR) .................. 10-2014-0067697
Jun. 2, 2015   (KR) .................. 10-2015-0078104

(51) Int. Cl.
```
C08F 4/6592      (2006.01)
C08F 210/16      (2006.01)
C08F 10/02       (2006.01)
C08F 110/02      (2006.01)
C08F 4/659       (2006.01)
C08F 4/64        (2006.01)
C08F 10/00       (2006.01)
```

(52) U.S. Cl.
CPC .............. *C08F 110/02* (2013.01); *C08F 4/64* (2013.01); *C08F 4/65904* (2013.01); *C08F 4/65927* (2013.01); *C08F 10/00* (2013.01); *C08F 4/6592* (2013.01); *C08F 4/65912* (2013.01); *C08F 4/65916* (2013.01); *C08F 4/65925* (2013.01); *C08F 210/16* (2013.01); *C08F 2420/06* (2013.01)

(58) Field of Classification Search
CPC .............. C08F 4/65927; C08F 4/65904; C08F 4/65912; C08F 10/02; C08F 210/16
See application file for complete search history.

(56) References Cited

U.S. PATENT DOCUMENTS

| | | | |
|---|---|---|---|
| 9,725,472 B2 * | 8/2017 | Lee | C07F 7/082 |
| 9,725,533 B2 * | 8/2017 | Lee | C08F 10/02 |
| 2006/0287449 A1 | 12/2006 | Miyamoto et al. | |
| 2009/0062488 A1 | 3/2009 | Nagy et al. | |
| 2012/0059135 A1 | 3/2012 | Michiue et al. | |
| 2013/0211020 A1 | 8/2013 | Lee et al. | |
| 2016/0237187 A1 * | 8/2016 | Hong | C08F 4/65927 |
| 2016/0237188 A1 * | 8/2016 | Hong | C08F 210/16 |

FOREIGN PATENT DOCUMENTS

| | | |
|---|---|---|
| EP | 2460809 A2 | 6/2012 |
| KR | 10-2005-0024287 A | 3/2005 |
| KR | 10-2011-0114473 A | 10/2011 |
| KR | 10-2012-0076156 A | 7/2012 |
| KR | 10-2012-0087706 A | 8/2012 |
| KR | 10-2012-0111530 A | 10/2012 |
| WO | 99/024446 A1 | 5/1999 |
| WO | 2005-010064 A1 | 2/2005 |
| WO | 2009-032049 A1 | 3/2009 |
| WO | 2015/016423 A1 | 2/2015 |
| WO | 2015-056975 A1 | 4/2015 |
| WO | 2015/076618 A1 | 5/2015 |

* cited by examiner

*Primary Examiner* — Caixia Lu
(74) *Attorney, Agent, or Firm* — Dentons US LLP

(57) ABSTRACT

The present invention relates to a method for preparing polyolefin that can easily and effectively prepare polyolefin having high molecular weight and various molecular weight distributions, which was difficult to prepare using the existing metallocene catalyst, and polyolefin prepared thereby. The method for preparing polyolefin comprises the step of polymerizing olefin monomers, in the presence of a metallocene supported catalyst wherein a metallocene compound having a specific chemical structure is supported in a carrier, and hydrogen gas.

12 Claims, No Drawings

METHOD FOR PREPARING POLYOLEFIN AND POLYOLEFIN PREPARED THEREBY

BACKGROUND OF THE INVENTION

(a) Field of the Invention

This application is a National Stage Entry of International Application No. PCT/KR2015/005580, filed Jun. 3, 2015, and claims the benefit of and priority to Korean Application No. 10-2014-0067697 filed on Jun. 3, 2014, and Korean Application No. 110-2015-0078104 filed on Jun. 2, 2015 all of which are hereby incorporated by reference in their entirety for all purposes as if fully set forth herein.

The present invention relates to a method for preparing polyolefin that can easily and effectively prepare polyolefin having high molecular weight and various molecular weight distributions, and polyolefin prepared thereby.

(b) Description of the Related Art

Olefin polymerization catalyst system is classified into Zeigler-Natta and metallocene catalyst systems, and these high activity catalyst systems have been developed according to each characteristic. Although a Zeigler-Natta catalyst has been widely applied for the existing commercial processes since it was invented in 1950's, since it is a multi site catalyst having a plurality of active sites, the molecular weight distribution of the prepared polymer is wide, and the composition distribution of comonomers is not uniform, and thus, it has a limitation in securing desired properties.

Particularly, in case ultra high molecular weight polyolefin having weight average molecular weight of 1,000,000 or more is prepared using a Zeigler-Natta catalyst, the amount of catalyst residue (Cl component and the like) is large, and thus, polyolefin may be decomposed at the time of molding process at high temperature, which may involve lowering of molecular weight of polyolefin. For this reason, there is a disadvantage in that excellent properties as ultra high molecular weight polyolefin cannot be adequately exhibited.

To the contrary, in case high molecular weight polyolefin is obtained using a metallocene catalyst, molecular weight distribution is relatively narrow, and thus, impact resistance may be improved. And, the amount of Cl component of catalyst residue is small, thus significantly inhibiting decomposition of polyolefin at the time of molding process. However, polyolefin prepared using a metallocene catalyst has a problem in terms of degraded processibility due to narrow molecular weight distribution.

In general, as a molecular weight distribution is wide, the degree of viscosity decrease according to shear rate becomes large, thus exhibiting excellent processibility in the processing area, but polyolefin prepared using a metallocene catalyst, due to the relatively narrow molecular weight distribution, has high viscosity at high shear rate, and thus, load or pressure is high at the time of extrusion, thus lowering extrusion productivity, bubble stability is significantly lowered at the time of blow molding process, and the surface of prepared molded product becomes non-uniform, thus causing decrease in transparency and the like.

And, in the process of obtaining high molecular weight polyolefin using a metallocene catalyst, molecular weight may be commonly controlled by controlling the introduction amount of hydrogen gas, and as the introduction amount of hydrogen gas increases, molecular weight of polyolefin decreases. Furthermore, even if polymerization is progressed without introduction of hydrogen gas, a beta hydrogen elimination reaction is excellent due to the property of a metallocene catalyst, and thus, it is practically difficult to obtain ultra high molecular weight polyolefin having weight average molecular weight of 1,000,000 or more.

Thus, there has been an attempt to obtain polyolefin simultaneously satisfying wider molecular weight distribution and high molecular weight.

However, due to high reactivity of a metallocene catalyst and the like, there was a limit in the preparation of polyolefin simultaneously satisfying wider molecular weight distribution and sufficiently high molecular weight. Accordingly, there is a continued demand for the development of technology capable of effectively preparing polyolefin that may simultaneously satisfy mechanical properties and processibility and the like, and may be preferably used for a large type product.

SUMMARY OF THE INVENTION

Accordingly, it is an object of the invention to provide a method for preparing polyolefin that can easily and effectively prepare polyolefin having high molecular weight and various molecular weight distributions, which was difficult to prepare using the existing metallocene catalyst, and polyolefin prepared thereby.

The present invention provides a method for preparing polyolefin comprising the step of polymerizing olefin monomers, in the presence of a supported metallocence catalyst wherein one or more kind of a first metallocene compound represented by the following Chemical Formula 1 and a cocatalyst are supported in a carrier, and hydrogen gas:

[Chemical Formula 1]

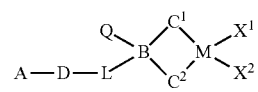

in the Chemical Formula 1,

A is hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

D is —O—, —S—, —N(R)— or —Si(R)(R')—, and R and R' are identical to or different from each other, and are each independently hydrogen, halogen, a C1 to C20 alkyl group, a C2 to C20 alkenyl group, or a C6 to C20 aryl group;

L is a C1 to C10 linear or branched alkylene group;

B is carbon, silicon or germanium;

Q is hydrogen, halogen, a C1 to C20 alkyl group, a C2 to C20 alkenyl group, a C6 to C20 aryl group, a C7 to C20 alkylaryl group, or a C7 to C20 arylalkyl group;

M is Group 4 transition metal;

$X^1$ and $X^2$ are identical to or different to each other, and are each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

$C^1$ and $C^2$ are identical to or different from each other, and are each independently represented by one of the following Chemical Formula 2a, Chemical Formula 2b or Chemical Formula 2c, provided that both $C^1$ and $C^2$ are not Chemical Formula 2c;

[Chemical Formula 2a]

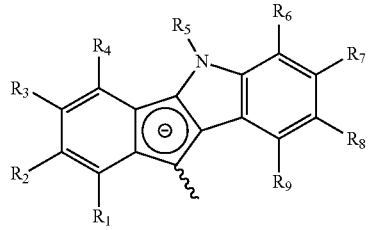

[Chemical Formula 2b]

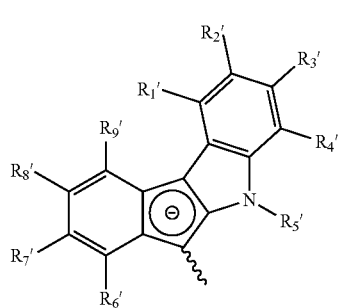

[Chemical Formula 2c]

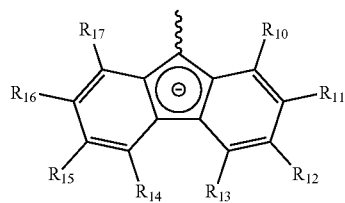

in the Chemical Formula 2a, 2b and 2c,

R1 to R17 and R1' to R9' are identical to or different from each other, and are each independently hydrogen, halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylalkyl group, and two or more neighboring groups of R10 to R17 may be connected to each other to form a substituted or unsubstituted aliphatic or aromatic ring.

The present invention also provides polyolefin prepared by the above method for preparing polyolefin.

According to the preparation method of the present invention, polyolefin having high molecular weight and various molecular weight distributions, which was difficult to prepare using the existing metallocene catalyst, can be very effectively prepared. Since such high molecular weight polyolefin has a small amount of catalyst residue due to the properties of polyolefin prepared using a metallocene catalyst, the decomposition of polyolefin may be inhibited at the time of a high temperature molding process. Thus, it may exhibit excellent properties according to high molecular weight and wide molecular weight distribution, and may be very preferably used for large type blow molding products, next generation pipe products requiring excellent pressure resistance and heat resistance, or injection products having good stress crack resistance, and the like.

And, polyolefin having various weight average molecular weights and molecular weight distributions may be prepared according to the combination of the metallocene compounds included in the metallocene catalyst of the present invention, interaction with a molecular weight control agent, and reactivity to hydrogen. Thus, polyolefin having desired properties may be easily prepared according to specific combination of metallocene compounds, and selective use of hydrogen and a molecular weight control agent.

DETAILED DESCRIPTION OF THE EMBODIMENTS

Hereinafter, a method for preparing polyolefin and polyolefin prepared thereby according to specific embodiments of the invention will be explained in detail.

According to one embodiment of the invention, provided is a method for preparing polyolefin comprising the step of polymerizing olefin monomers, in the presence of a supported metallocence catalyst wherein at least one first metallocene compound represented by the following Chemical Formula 1 and a cocatalyst are supported in a carrier, and hydrogen gas:

[Chemical Formula 1]

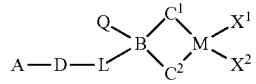

in the Chemical Formula 1,

A is hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

D is —O—, —S—, —N(R)— or —Si(R)(R')—, and R and R' are identical to or different from each other, and are each independently hydrogen, halogen, a C1 to C20 alkyl group, a C2 to C20 alkenyl group, or a C6 to C20 aryl group;

L is a C1 to C10 linear or branched alkylene group;

B is carbon, silicon or germanium;

Q is hydrogen, halogen, a C1 to C20 alkyl group, a C2 to C20 alkenyl group, a C6 to C20 aryl group, a C7 to C20 alkylaryl group, or a C7 to C20 arylalkyl group;

M is Group 4 transition metal;

$X^1$ and $X^2$ are identical to or different to each other, and are each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

$C^1$ and $C^2$ are identical to or different from each other, and are each independently represented by one of the following Chemical Formula 2a, Chemical Formula 2b or Chemical Formula 2c, provided that both $C^1$ and $C^2$ are not Chemical Formula 2c;

[Chemical Formula 2a]

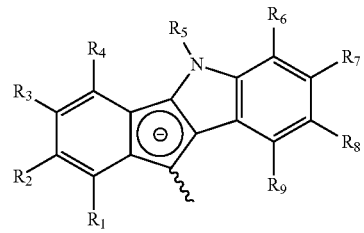

[Chemical Formula 2b]

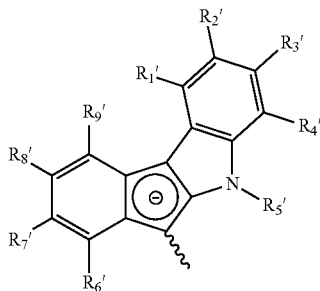

[Chemical Formula 2c]

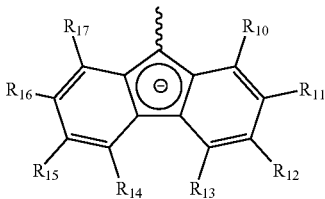

in the Chemical Formula 2a, 2b and 2c,

R1 to R17 and R1' to R9' are identical to or different from each other, and are each independently hydrogen, halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylalkyl group, and two or more neighboring groups of R10 to R17 may be connected to each other to form a substituted or unsubstituted aliphatic or aromatic ring.

In the method for preparing polyolefin of one embodiment, olefin monomers are polymerized in the presence of a supported metallocence catalyst wherein one or more kind of a first metallocene compound represented by the Chemical Formula 1 and a cocatalyst are supported in a carrier, and hydrogen gas to prepare polyolefin.

In this preparation method, the first metallocene compound of the Chemical Formula 1 forms a structure wherein an indeno indole derivative and/or a fluorene derivative are crosslinked by a bridge, and has lone electron pair capable of acting as a Lewis base in the ligand structure, and thus, is supported on the carrier surface having Lewis acid property to exhibit higher polymerization activity. And, as it includes electron-rich indeno indole group and/or fluorenyl group, it has high activity, and due to appropriate steric hindrance and the electronic effect of the ligand, it has low hydrogen reactivity, and maintains high activity. And, as the nitrogen atom of the indeno indole derivative stabilizes beta-hydrogen of growing polymer chain by hydrogen bond, beta-hydrogen elimination may be inhibited, and thus, ultra high molecular weight olefin polymer may be polymerized. And, since it has low hydrogen activity, it may prepare polyolefin having high weight average molecular weight and wide molecular weight distribution.

Furthermore, it was confirmed that by appropriately using a second metallocene compound and a molecular weight control agent that can selectively prepare medium molecular weight or low molecular weight polyolefin, in addition to the first metallocene compound of the Chemical Formula 1 and hydrogen gas, polyolefin having high molecular weight and various molecular weight distributions, which was difficult to prepare using the existing metallocene catalyst, may be prepared, and completed the invention.

Hereinafter, each substituent of the first metallocene compound of the Chemical Formula 1 is explained in detail.

The C1 to C20 alkyl may include linear or branched alkyl, specifically, methyl, ethyl, propyl, isopropyl, n-butyl, tert-butyl, pentyl, hexyl, heptyl, octyl and the like, but is not limier thereto.

The C2 to C20 alkenyl may include linear or branched alkenyl, and specifically, allyl, ethenyl, propenyl, butenyl, pentenyl and the like, but is not limiter thereto.

The C6 to C20 aryl may include monocyclic or condensed cyclic aryl, and specifically, phenyl, biphenyl, naphthyl, phenantrenyl, fluorenyl and the like, but is not limited thereto.

The C5 to C20 heteroaryl may include monocyclic or condensed cyclic heteroaryl, and specifically, carbozolyl, pyridyl, quinoline, isoquinoline, thiophenyl, furanyl, imidazole, oxazolyl, thiazolyl, triazine, tetrahydropyranyl, tetrahydrofuranyl and the like, but is not limited thereto.

The C1 to C20 alkoxy may include methoxy, ethoxy, phenyloxy, cyclohexyloxy, and the like, but is not limited thereto.

The Group 4 transition metal may include titanium, zirconium hafnium and the like, but is not limited thereto.

It is more preferable that in the Chemical Formulae 2a, 2b and 2c which are ligand-derived structures included in the Chemical Formula 1, $R_1$ to $R_{17}$ and $R_1'$ to $R_9'$ are each independently hydrogen, methyl, ethyl, propyl, isopropyl, n-butyl, tert-butyl, pentyl, hexyl, heptyl, octyl, phenyl, halogen, trimethylsilyl, triethylsilyl, tripropylsilyl, tributylsilyl, triisopropylsilyl, trimethylsilylmethyl, methoxy, or ethoxy, but are not limited thereto.

It more preferable that L of the Chemical Formula 1 is C4 to C8 linear or branched alkylene, but is not limited thereto. And, the alkylene group may be unsubstituted or substituted with C1 to C20 alkyl, C2 to C20 alkenyl, or C6 to C20 aryl.

And, it is preferable that A of the Chemical Formula 1 is hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, or tetrahydrofuranyl, but is not limited thereto.

And, it is preferable that B of the Chemical Formula 1 is silicon, but is not limited thereto.

According to one embodiment of the invention, specific examples of the compound represented by the Chemical Formula 2a may include compounds represented by the following structural formulae, but are not limited thereto.

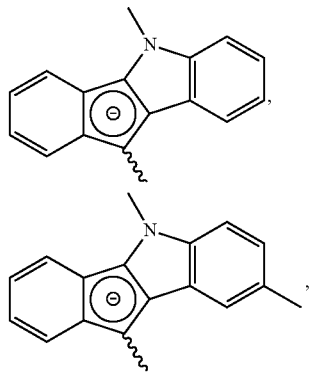

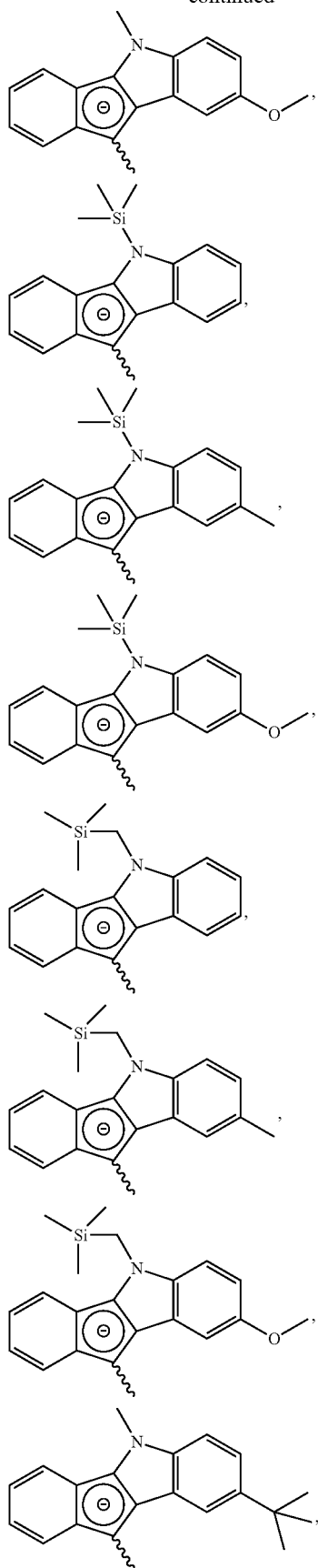
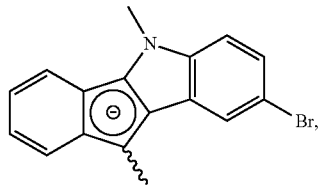
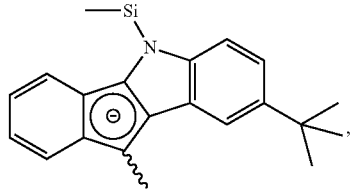
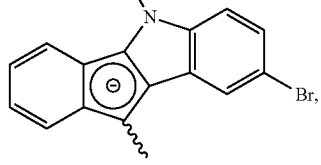
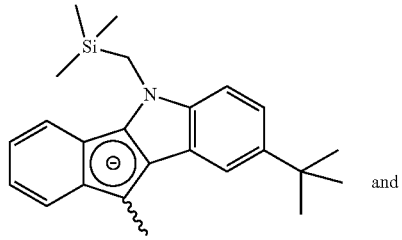
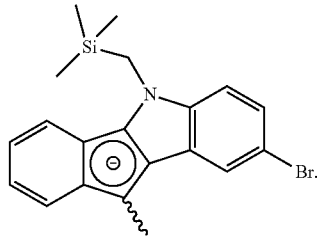
According to one embodiment of the invention, specific examples of the compound represented by the Chemical Formula 2b may include compounds represented by the following structural formulae, but are not limited thereto.
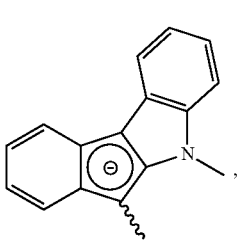 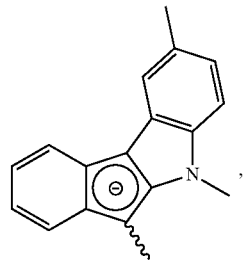

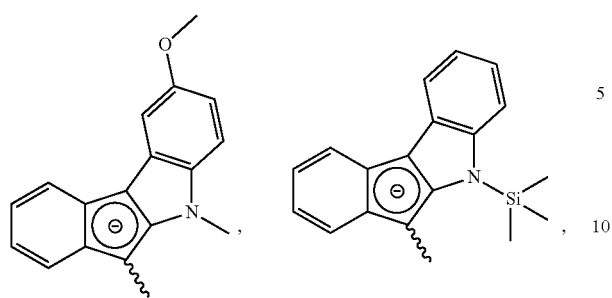
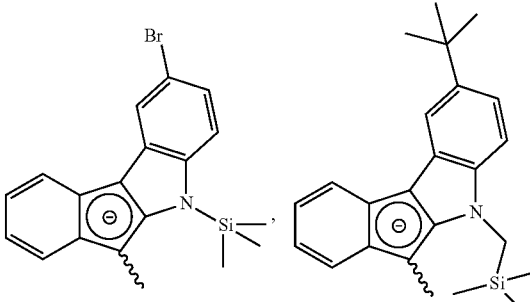
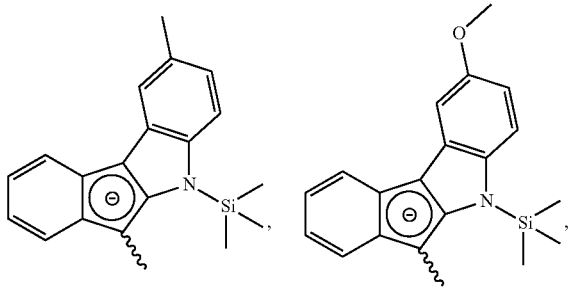
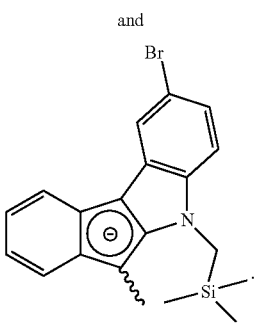
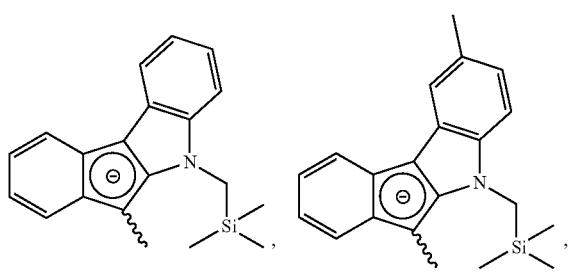
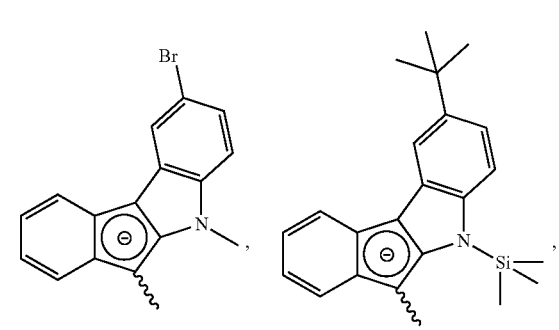
and
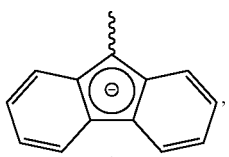
According to one embodiment of the invention, specific examples of the compound represented by the Chemical Formula 2c may include compounds represented by the following structural formulae, but are not limited thereto.
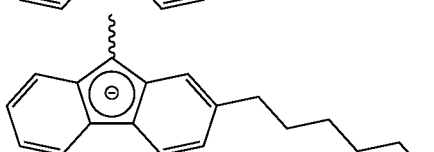
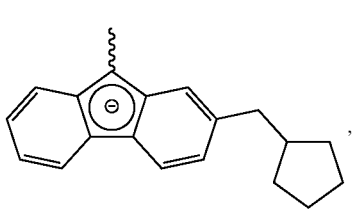
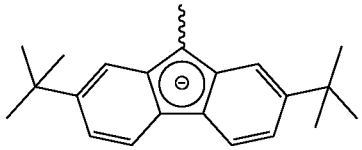
and
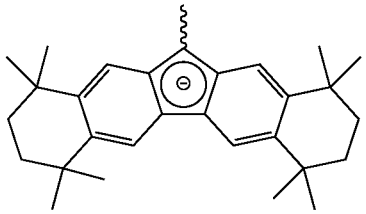

In addition, specific examples of the first metallocene compound represented by the Chemical Formula 1 may include compounds represented by the following structural formulae, but are not limited thereto.
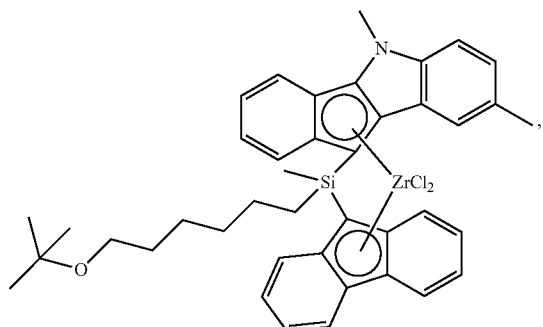
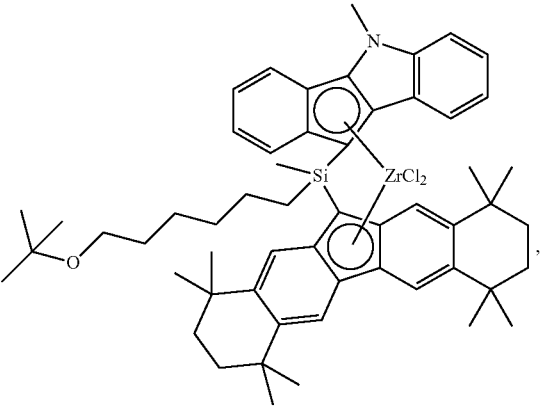
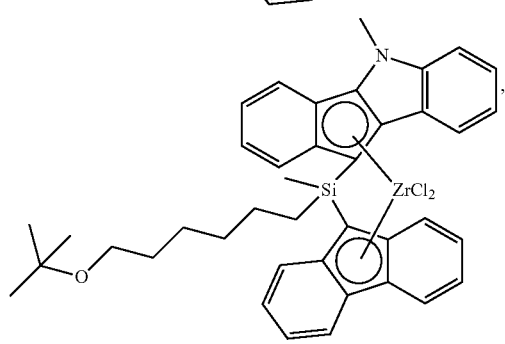
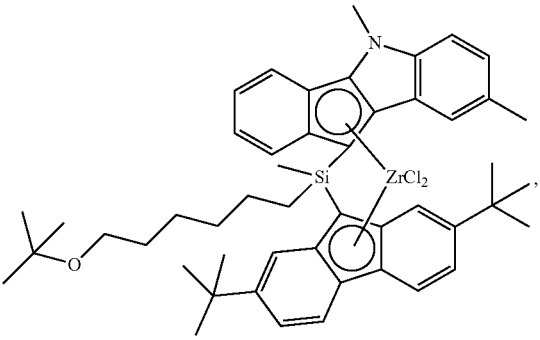
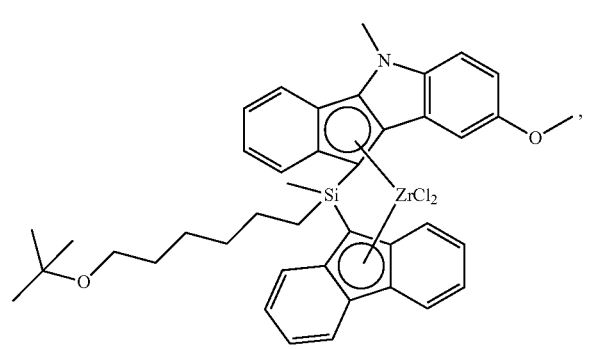
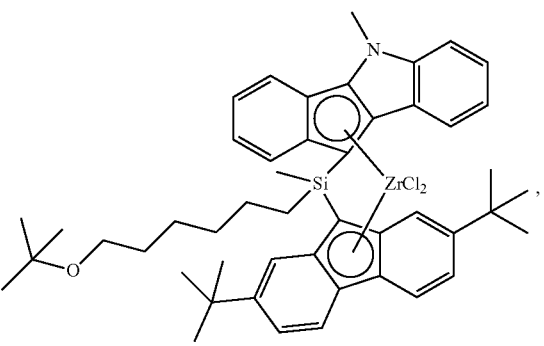
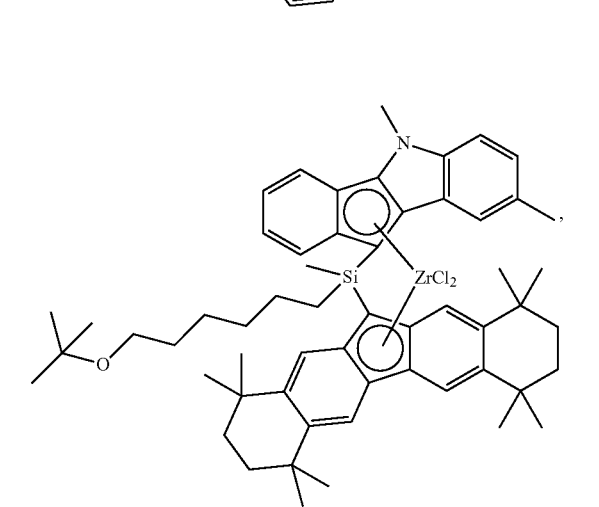
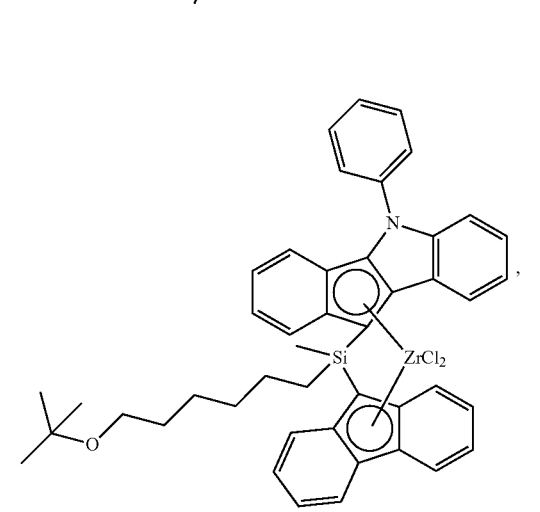

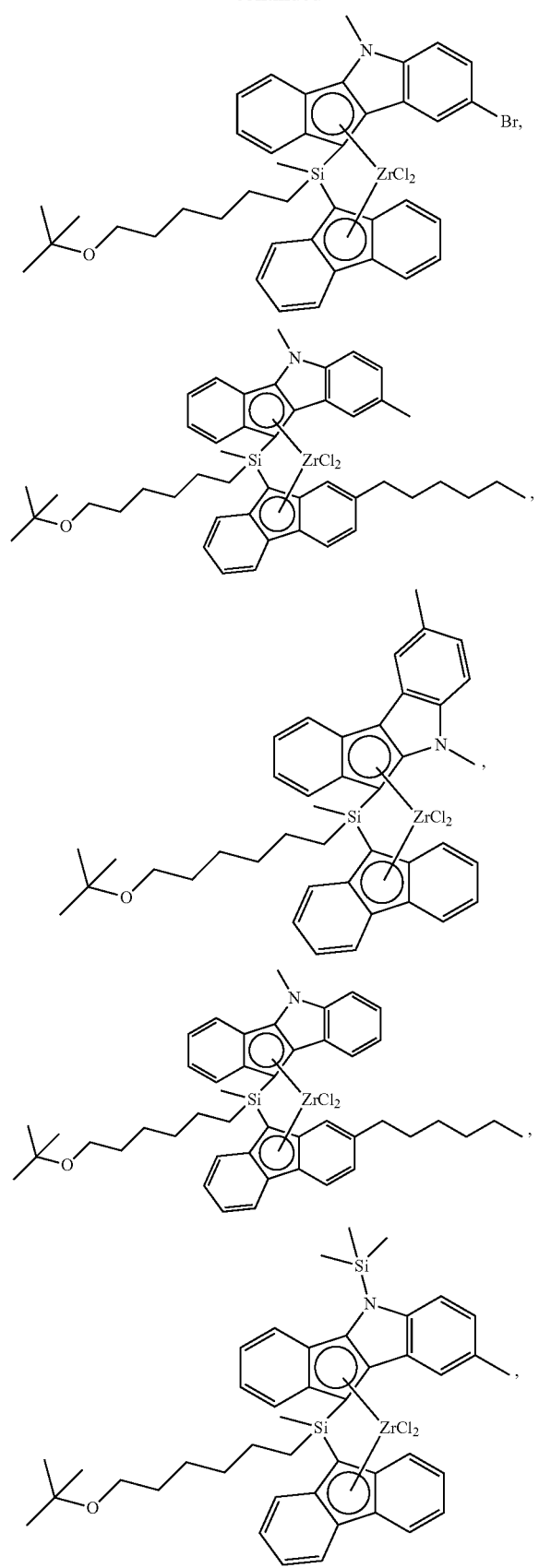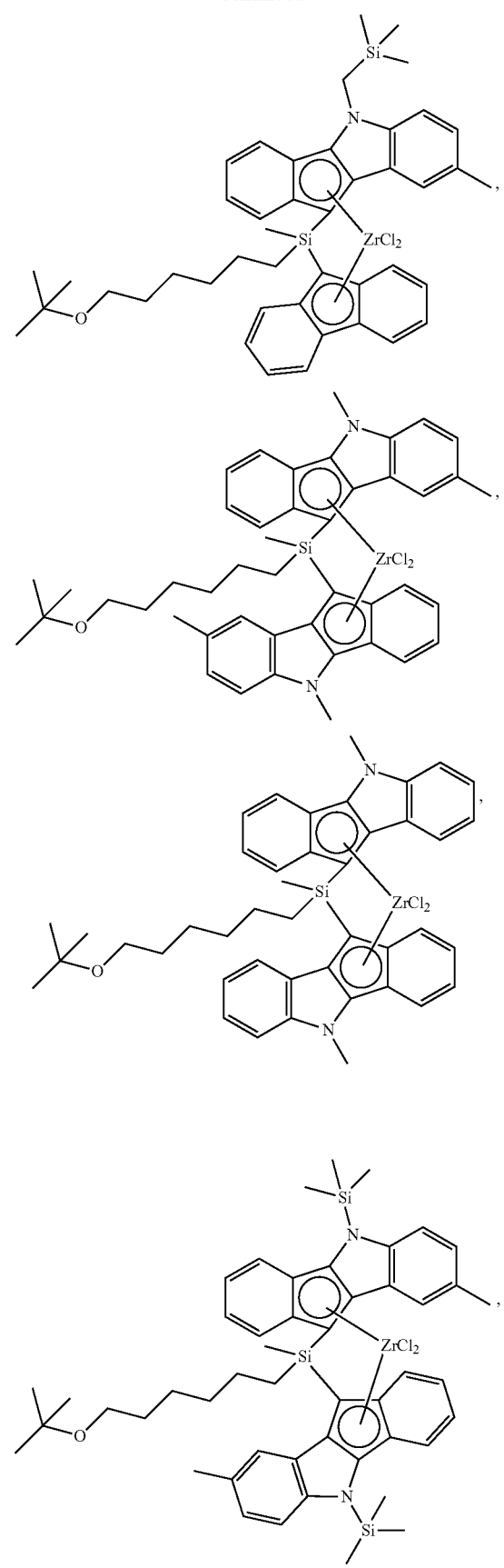

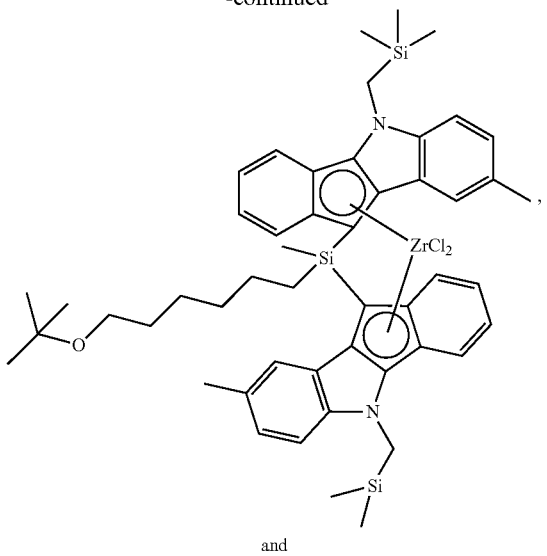

,

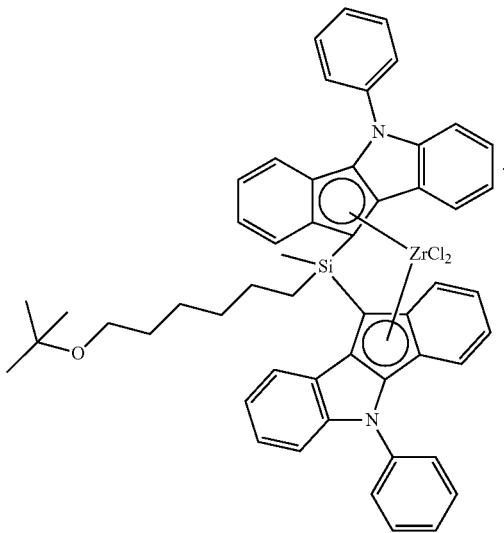

and

The above explained first metallocene compound of the Chemical Formula 1 has excellent activity and can polymerize high molecular weight polyolefin. Particularly, since it exhibits high polymerization activity even when supported in a carrier, it enables preparation of ultra high molecular weight polyolefin.

And, even in case a polymerization reaction is progressed with hydrogen so as to prepare polyolefin having high molecular weight and simultaneously wide molecular weight distribution, the first metallocene compound according to the present invention exhibits low hydrogen reactivity, and thus, ultra high molecular weight polyolefin may be polymerized with still high activity. Thus, even if used in a mixture with catalysts having other properties, olefin polymer satisfying high molecular weight properties may be prepared without lowering of activity, and thus, olefin polymer including high molecular weight olefin polymer and yet having wide molecular weight distribution may be easily prepared.

The first metallocene compound of the Chemical Formula 1 may be obtained by connecting an indenoindole derivative and/or a fluorene derivative by a bridge compound to prepare a ligand compound, and then, introducing a metal precursor compound to conduct metallation. The preparation method of the first metallocene compound will be concretely explained in examples described below.

Meanwhile, according to one embodiment of the invention, the supported metallocene catalyst may be a single supported metallocene catalyst comprising one or more kind of the first metallocene compound represented by the Chemical Formula 1, a cocatalyst compound and a carrier, or a hybrid supported metallocene catalyst comprising one or more kind of the first metallocene compound represented by the Chemical Formula 1, one or more kind of the second metallocene catalyst, a cocatalyst compound and a carrier. Namely, in the present invention, the supported metallocene catalyst or metallocene supported catalyst includes single supported metallocene catalysts wherein one or more kind of the first metallocene compound is supported only, and hybrid supported metallocene catalyst wherein one or more kind of the first metallocene compound and one or more kind of the second metallocene compound are supported.

The second metallocene compound may be selected from the compounds represented by the following Chemical Formula 3 to Chemical Formula 5.

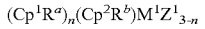 [Chemical Formula 3]

in the Chemical Formula 3, $M^1$ is a Group 4 transition metal;

$Cp^1$ and $Cp^2$ are identical to or different from each other, and are each independently one selected from the group consisting of cyclopentadienyl, indenyl, 4,5,6,7-tetrahydro-1-indenyl, and fluorenyl radicals, which may be substituted with hydrocarbon having a carbon number of 1 to 20;

$R^a$ and $R^b$ are identical to or different from each other, and are each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^1$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

n is 1 or 0;

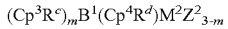 [Chemical Formula 4]

in the Chemical Formula 4, $M^2$ is a Group 4 transition metal;

$Cp^3$ and $Cp^4$ are identical to or different from each other, and are each independently one selected from the group consisting of cyclopentadienyl, indenyl, 4,5,6,7-tetrahydro-1-indenyl, and fluorenyl radicals, which may be substituted with hydrocarbon having a carbon number of 1 to 20;

$R^c$ and $R^d$ are identical to or different from each other, and are each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^2$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

$B^1$ is one or more of carbon, germanium, silicon, phosphorus or nitrogen-containing radical, or a combination thereof, which crosslinks a $Cp^3R^c$ ring with a $Cp^4R^d$ ring, or crosslinks one $Cp^4R^d$ ring to $M^2$;

m is 1 or 0;

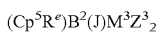 [Chemical Formula 5]

in the Chemical Formula 5, $M^3$ is a Group 4 transition metal;

$Cp^5$ is one selected from the group consisting of cyclopentadienyl, indenyl, 4,5,6,7-tetrahydro-1-indenyl and fluorenyl radicals, which may be substituted with hydrocarbon having a carbon number of 1 to 20;

$R^e$ is hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^3$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

$B^2$ is one or more of carbon, germanium, silicon, phosphorus or nitrogen-containing radicals or a combination thereof, which crosslinks a $Cp^5R^e$ ring with J; and J is one selected from the group consisting of $NR^f$, O, $PR^f$ and S, wherein $R^f$ is $C_{1-20}$ alkyl, aryl, substituted alkyl, or substituted aryl.

In the Chemical Formula 4, in case m is 1, it means a bridge compound structure wherein a $Cp^3R^c$ ring and a $Cp^4R^d$ ring or a $Cp^4R^d$ ring and $M^2$ are crosslinked by $B^1$, and in case m is 0, it means a non-crosslinked compound structure.

The second metallocene compound represented by the Chemical Formula 3 may be, for example, a compound represented by one of the following structural formulae, but is not limited thereto.

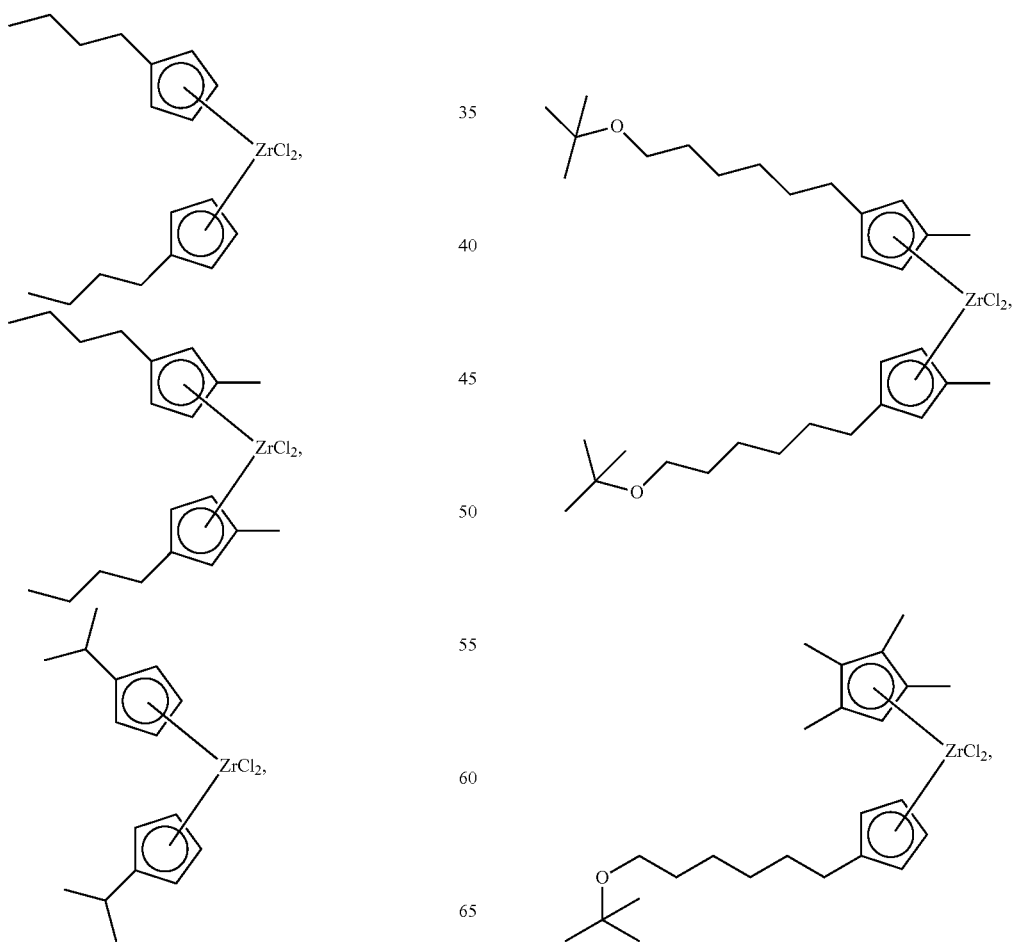

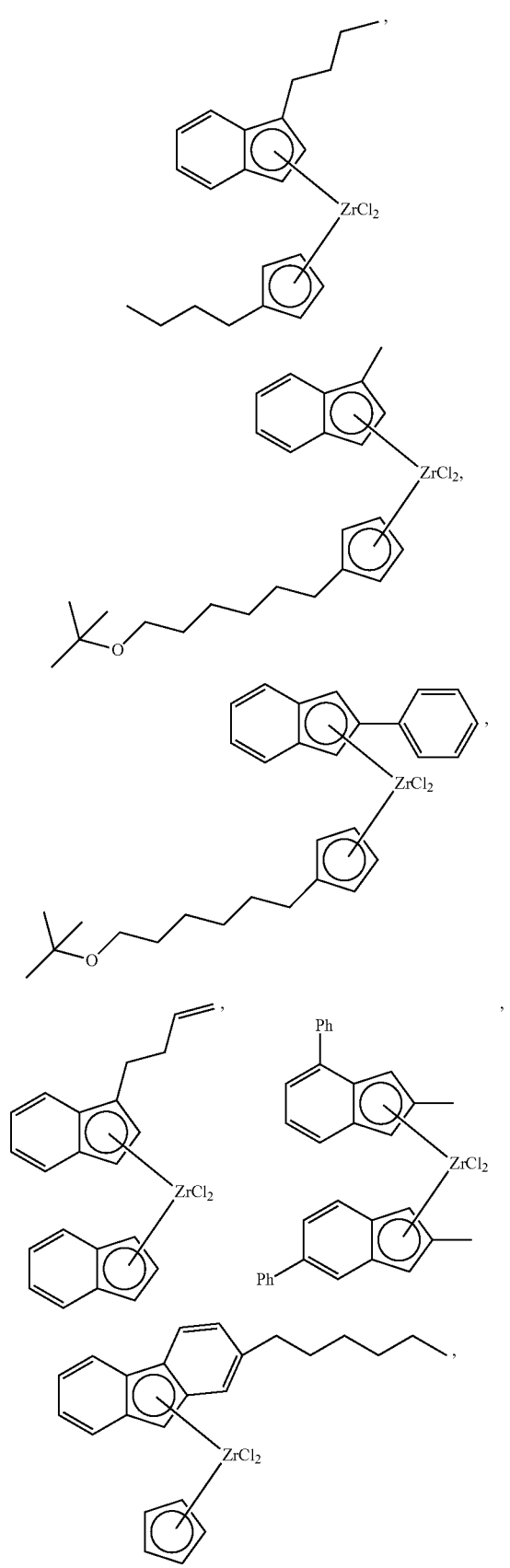
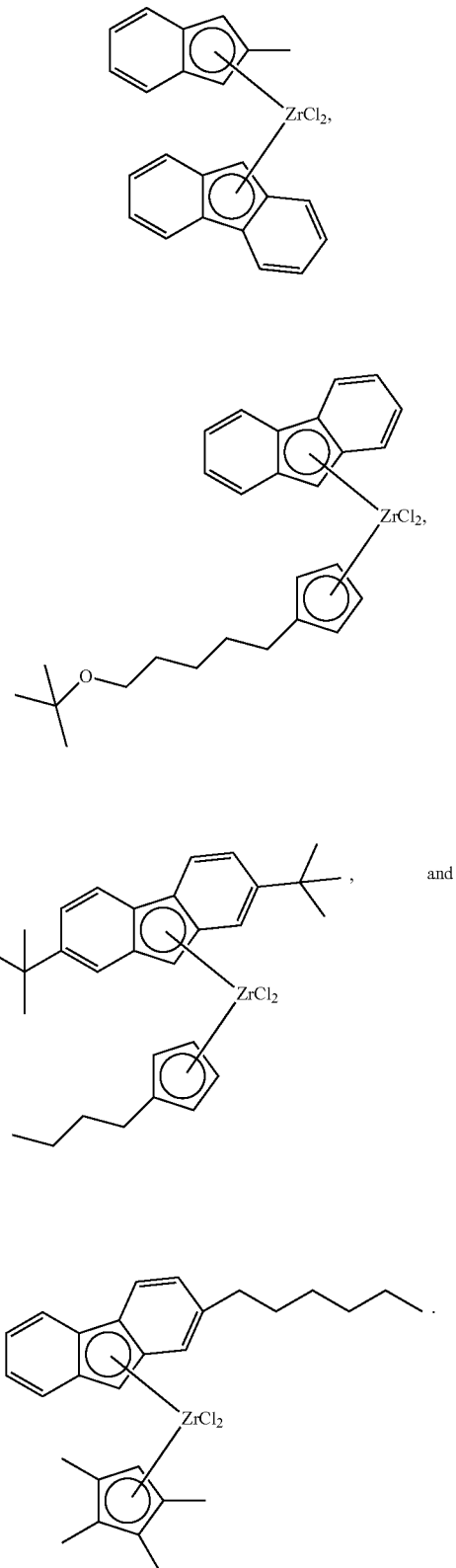
The second metallocene compound represented by the Chemical Formula 4 may be, for example, a compound represented by one of the following structural formulae, but is not limited thereto.

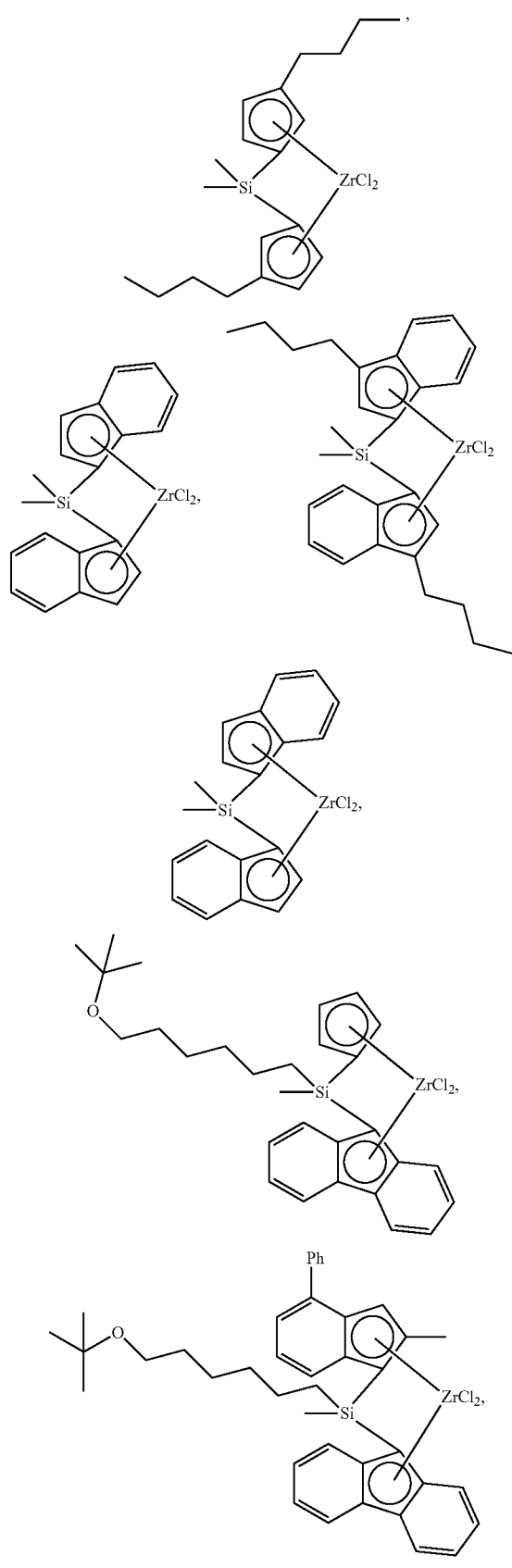
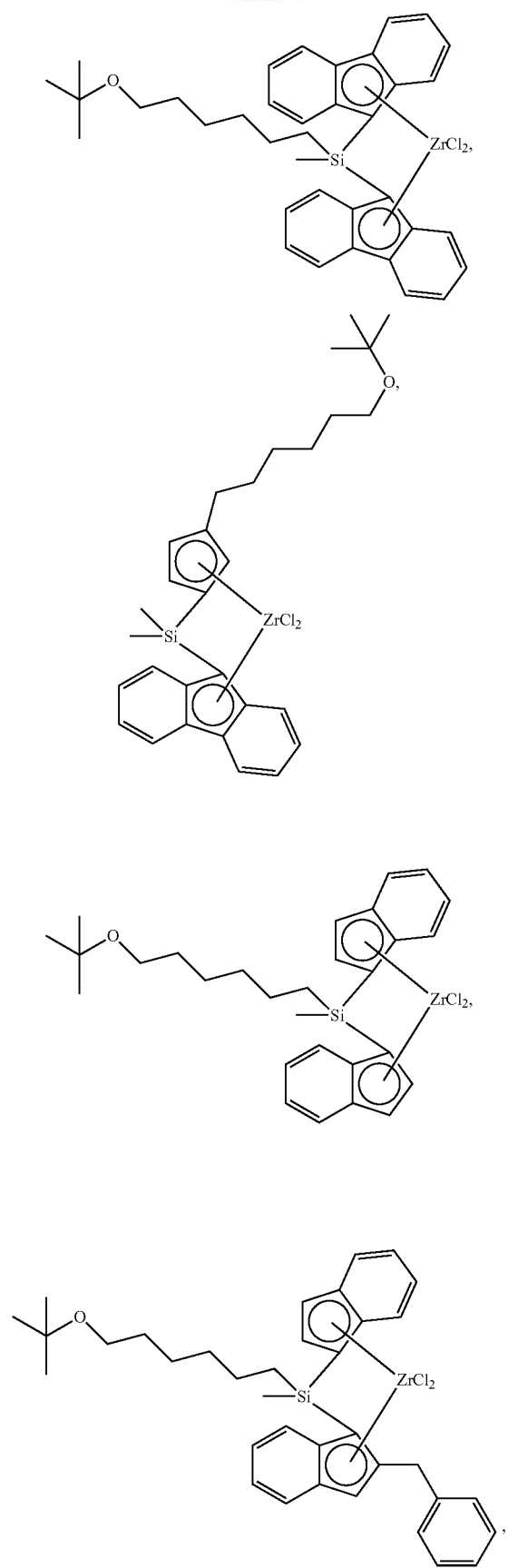

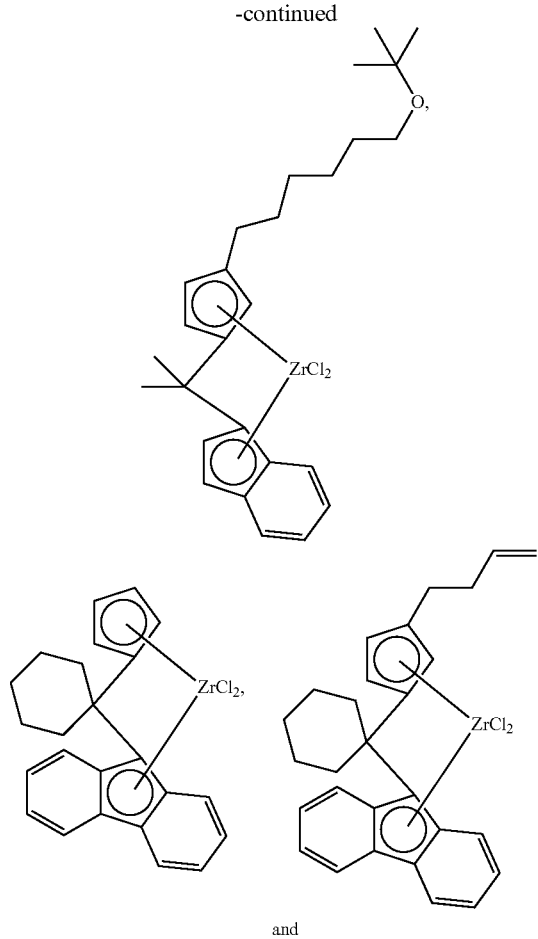
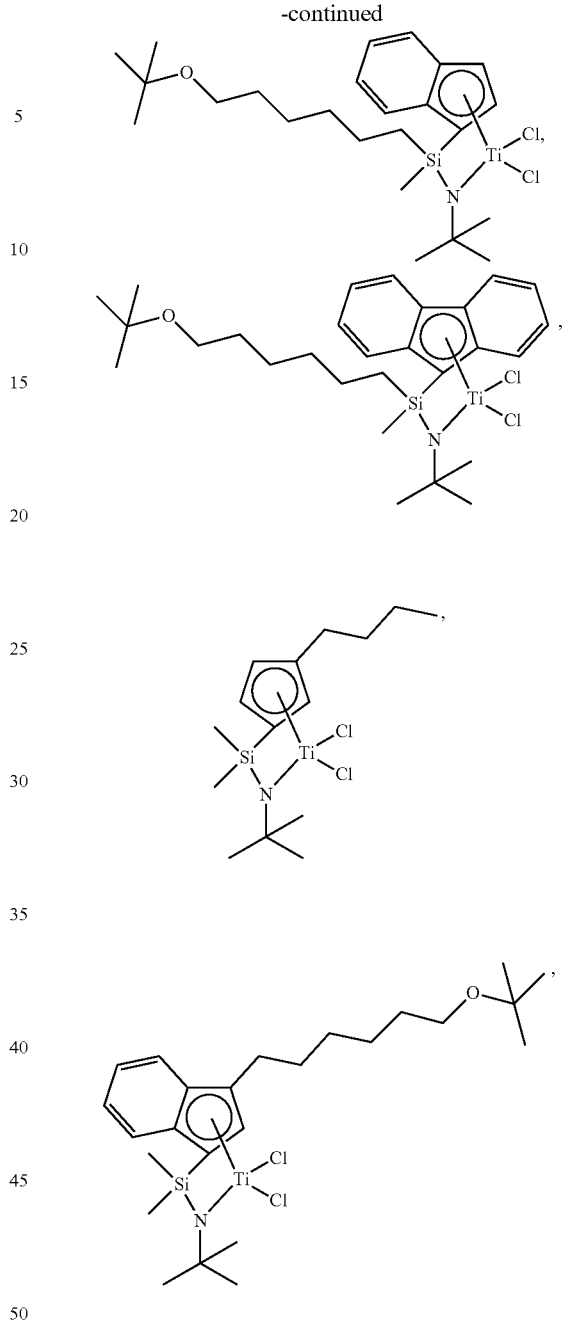
The second metallocene compound represented by the Chemical Formula 5 may be, for example, a compound represented by one of the following structural formulae, but is not limited thereto.
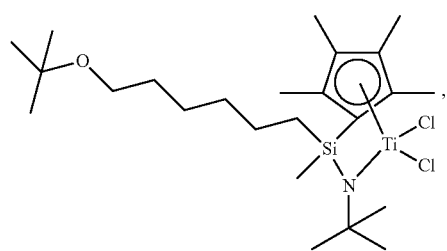
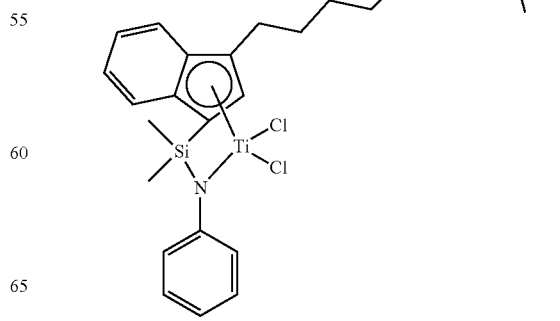

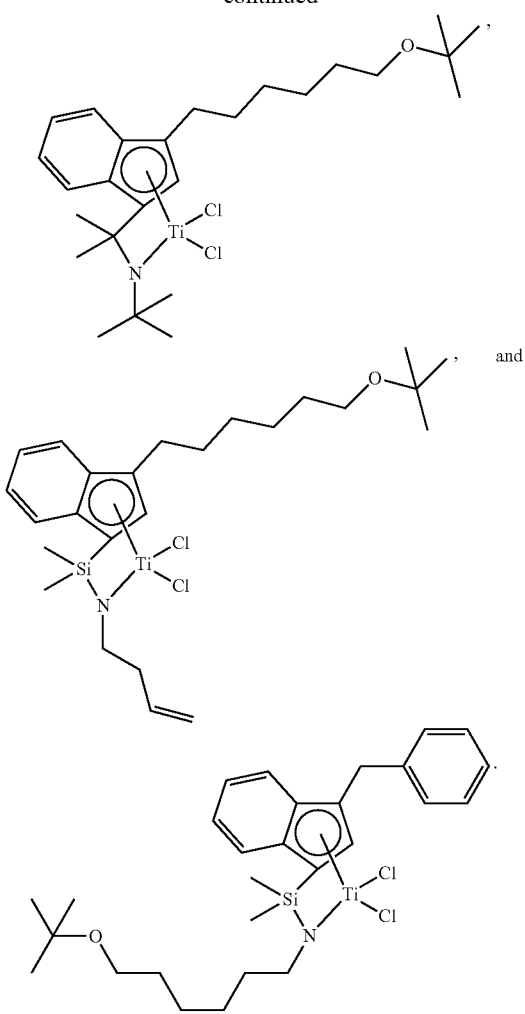

and

The hybrid supported metallocene catalyst may be those wherein one or more kind of the first metallocene compound represented by the Chemical Formula 1, and one or more kind of the second metallocene compound selected from the compounds represented by the Chemical Formulae 3 to 5 are supported in a carrier together with a cocatalyst compound.

In the hybrid supported metallocene catalyst, the first metallocene compound represented by the Chemical Formula 1 may mainly contribute to making high molecular weight copolymer having high SCB (short chain branch) content, and the second metallocene compound represented by the Chemical Formula 3 may mainly contribute to making lower molecular weight copolymer having low SCB content. And, the second metallocene compound represented by the Chemical Formula 4 or 5 may contribute to making low molecular weight copolymer having medium SCB content.

In the hybrid supported metallocene catalyst, the first metallocene compound forms a structure wherein an indeno indole derivative and/or a fluorene derivative are crosslinked by a bridge, and has a lone electron pair capable of acting as Lewis acid in the ligand structure, and thus, is supported on the surface of a carrier having Lewis acid property, thus exhibiting high polymerization activity even when supported. And, as it includes electron-rich indeno indole group and/or fluorenyl group, it has high activity, and due to appropriate steric hindrance and the electronic effect of the ligand, it has low hydrogen reactivity, and maintains high activity even when hydrogen exists. Thus, if a hybrid supported metallocene catalyst ire pared using such a transition metal compound, the nitrogen atom of the indeno indole derivative stabilizes beta-hydrogen of growing polymer chain by hydrogen bond, and thus, ultra high molecular weight olefin polymer may be polymerized.

And, since the hybrid supported metallocene catalyst of the present invention comprises the first metallocene compound represented by the Chemical Formula 1 and the second metallocene compound selected from the compounds represented by the Chemical Formulae 3 to 5, it comprises at least two different kinds of metallocene compounds, and thus, it may prepare high molecular weight olefin copolymer having high SCB content, and simultaneously having wide molecular weight distribution and thus excellent properties and processibility.

In the supported metallocene catalyst according to the present invention, as the cocatalyst that is supported together with a carrier so as to activate the first and the second metallocene compounds, organic metal compounds including Group 13 metal may be used without specific limitations as long as it can be used when polymerizing olefin in the presence of a common metallocene catalyst.

According to one embodiment of the invention, the cocatalyst compound may comprise at least one of an aluminum-containing first cocatalyst of the following Chemical Formula 6, and a borate-based second cocatalyst of the following Chemical Formula 7.

$$—[Al(R_{18})—O—]_k—$$ [Chemical Formula 6]

in the Chemical Formula 6, $R_{18}$ are each independently halogen, a C1-20 hydrocarbyl group unsubstituted or substituted by halogen, and k is an integer of 2 or more, $$T^+[BG_4]^-$$ [Chemical Formula 7]

in the Chemical Formula 7, $T^+$ is polyatomic ion having a valence of +1, B is boron in +3 oxidation state, and G's are each independently selected from the group consisting of hydride, dialkylamido, halide, alkoxide, aryloxide, hydrocarbyl, halocarbyl and halo-substituted hydrocarbyl, and G has 20 or less carbon, provided that G is halide in one or less position.

Due to the use of the first and second cocatalysts, the molecular weight distribution of the finally prepared polyolefin may become more uniform, and polymerization activity may be improved.

The first cocatalyst of the Chemical Formula 6 may be an alkyaluminoxane compound including repeat units bonded in a linear, circular or network shape, and specific examples thereof may include methylaluminoxane (MAO), ethylaluminoxane, isobutylaluminoxane, or butylaluminoxane, and the like.

And, the second cocatalyst of the Chemical Formula 7 may be a borate-based compound in the form of trisubstituted ammonium salt, dialkyl ammonium salt, or trisubstituted phosphonium salt. Specific examples of the second cocatalyst may include borate-based compounds in the form of tri-substituted ammonium salts, such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl (2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl) borate, triethylammonium tetrakis(pentafluorophenyl)borate, tripropylammonium tetrakis(pentafluorophenyl)borate, tri(n-butyl)ammonium tetrakis(pentafluorophenyl)borate, tri (sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl(borate, tripropylammonium tetrakis(2,3,4,6-tetrafluorophenyl)borate, tri(n-butyl)ammonium tetrakis(2, 3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate and N,N-dimethyl-(2,4,6-trimethylanilinium)tetrakis-(2,3,4,6-tetrafluorophenyl)borate; borate-based compounds in the form of dialkyl ammonium salts, such as dioctadecylammonium tetrakis(pentafluorophenyl)borate, ditetradecylammonium tetrakis(pentafluorophenyl)borate and dicyclohexylammonium tetrakis(pentafluorophenyl)borate; and borate-based compounds such as tri-substituted phosphonium salts, such as triphenylphosphonium tetrakis(pentafluorophenyl) borate, methyldioctadecylphosphonium tetrakis(pentafluorophenyl)borate and tri(2,6-dimethylphenyl)phosphonium tetrakis(pentafluorophenyl)borate.

In the single supported metallocene catalyst or hybrid supported metallocene catalyst, the mass ratio of total transition metal included in the first and second metallocene compounds to the carrier may be 1:10 to 1:1,000. When the carrier and the metallocene compounds are included in the above mass ratio, the optimum shape may be exhibited.

And, the mass ratio of the cocatalyst compound to the carrier may be 1:1 to 1:100. And, the mass ratio of the first and the second metallocene compounds may be 10:1 to 1:10, preferably 5:1 to 1:5. When the cocatalyst and the metallocene compounds are included in the above mass ratio, activity and polymer fine structure may be optimized.

In the preparation method of polyolefin, as the carrier, those containing hydroxyl groups on the surface may be used, and preferably, dried and surface moisture-removed carriers having highly reactive hydroxyl groups and siloxane groups may be used.

For example, silica, silica-alumina and silica-magnesia and the like dried at high temperature may be used, and they may commonly contain oxide, carbonate, sulfate, and nitrate such as $Na_2O$, $K_2CO_3$, $BaSO_4$, and $Mg(NO_3)_2$, and the like.

The drying temperature of the carrier may be preferably 200 to 800° C., more preferably 300 to 600° C., and most preferably 300 to 400° C. If the drying temperature of the carrier is less than 200° C., due to excessive moisture, surface moisture may react with the cocatalyst, and if it is greater than 800° C., pores on the carrier surface may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the carrier surface may be preferably 0.1 to 10 mmol/g, more preferably 0.5 to 5 mmol/g. The amount of the hydroxyl groups on the carrier surface may be controlled by the preparation method and conditions of carrier, or drying conditions, for example, temperature, time, vacuum or spray drying and the like.

If the amount of the hydroxyl groups are less than 0.1 mmol/g, the reaction sites with the cocatalyst may be little, and if it is greater than 10 mmol/g, there is a possibility of being derived from moisture other than hydroxyl groups on the carrier particle surface, which is not preferable.

In the single supported metallocene catalyst or hybrid supported metallocene catalyst, the mass ratio of total transition metals included in the first and second metallocene compounds: carrier may be about 1:10 to 1:1,000. When the carrier and the metallocene compounds are included in the above mass ratio, the optimum shape may be exhibited.

Meanwhile, in the preparation method of polyolefin according to one embodiment, olefin monomers may be polymerized to prepare polyolefin selectively in the presence of a molecular weight control agent, in addition to the above explained supported metallocene catalyst and hydrogen gas.

According to one embodiment of the invention, the molecular weight control agent may include a mixture or a reaction product of a cyclopentadienyl metal compound of the following Chemical Formula 8, and an organic aluminum compound of the following Chemical Formula 9.

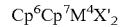  [Chemical Formula 8]

in the Chemical Formula 8, $Cp^6$ and $Cp^7$ are each independently a ligand including a substituted or unsubstituted cyclopentadienyl group, a substituted or unsubstituted indenyl group, or a substituted or unsubstituted fluorenyl group, M' is a Group 4 transition metal, and X' is halogen;

  [Chemical Formula 9]

in the Chemical Formula 9, $R^f$, $R^g$ and $R^h$ are each independently a C4-20 alkyl group or halogen, and at least one of $R_d$, $R_e$ and $R_f$ is a C4-20 alkyl group.

The molecular weight control agent itself does not exhibit activity as olefin polymerization catalyst, and although the mechanism of the action has not been specifically found out, it was confirmed to aid in the activity of a metallocene catalyst to enable preparation of polyolefin having higher molecular weight and wider molecular weight distribution.

It was confirmed that due to the interaction between the molecular weight control agent, hydrogen gas, and the first and second metallocene catalysts, polyolefin having higher molecular weight and wider molecular weight distribution may be prepared.

And, the polymerization reaction for the preparation of polyolefin for blow molding and the like may be progressed by slurry phase polymerization and the like in aliphatic hydrocarbon organic solvents such as hexane and the like. However, as the molecular weight control agent is formed from an organic aluminum compound of the Chemical Formula 9 having an alkyl group of a carbon number of 4 or more, it may exhibit more excellent solubility to the aliphatic hydrocarbon organic solvents such as hexane and the like. Thus, the molecular weight control agent may be stably dissolved in an organic solvent that is used as a reaction medium or diluent and supplied to a reaction system, and may exhibit the action and the effect more uniformly and excellently during the polymerization process. And, since polyolefin having excellent properties may be prepared even if the aliphatic hydrocarbon organic solvent such as hexane and the like is used as a reaction medium and the like, there is no need to use aromatic hydrocarbon organic solvents, there is no problem in terms of odor and taste and the like due to the aromatic hydrocarbon organic solvent remaining in polyolefin or products, and thus, polyolefin prepared by one embodiment may be very suitably used for large type products and the like.

Thus, according to one embodiment, polyolefin that has higher molecular weight and wider multimodal molecular weight distribution, and thus, may exhibit excellent mechanical properties and processibility, and may be preferably used for large type products and the like may be more effectively prepared.

Thus, in the preparation process of polyolefin of one embodiment, using the molecular weight control agent and hydrogen, and the above explained single supported metallocene catalyst or hybrid supported metallocene catalyst, ultra high molecular weight polyolefin may be more effectively prepared.

In the molecular weight control agent, specific examples of the cyclopentadienyl metal compound of the Chemical Formula 8 may include biscyclopentadienyl titanium dichloride, biscyclopentadienyl zirconium dichloride, biscyclopentadienyl hafnium dichloride, bisindenyltitanium dichloride or bisfluorenyl titanium dichloride and the like. And, specific examples of the organic aluminum compound of the Chemical Formula 9 may include triisobutyl aluminum, trihexylaluminum, trioctyl aluminum, diisobutylaluminum chloride, dihexylaluminum chloride or isobutylaluminum dichloride and the like.

And, it is preferable that the compound of the Chemical Formula 8 and the compound of the Chemical Formula 9 are used in the mole ratio of about 1:0.1 to 1:100, or about 1:0.5 to 1:10, based on the mole ratio of metal atom ($M^4$) included in the Chemical Formula 8 and the aluminum (Al) included in the Chemical Formula 9.

And, the molecular weight control agent may be used in the content of about $10^{-7}$ to $10^{-1}$ parts by weight, or about $10^{-5}$ to $10^{-2}$ parts by weight, based on 100 parts by weight of the first and second olefin monomers. As it is used in the above content range, the action and the effect due to the addition of the molecular weight control agent may be optimized to obtain polyolefin having low polymer melt index, wide molecular weight distribution, high molecular weight, and more improved stress crack resistance compared to density or polymer melt index.

Meanwhile, although the above explained molecular weight control agent may be used while being supported in a carrier together with the above explained first and second metallocene compounds, it may be added and mixed with a reaction system separately from the supported metallocene catalyst.

And, the molecular weight control agent may be used in the amount such that the mole ratio of the transition metal included in the first and second metallocene compounds: the molecular weight control agent becomes about 1:0.1 to 1:2, or about 1:0.2 to 1:1.5. If the amount of the molecular weight control agent is too small, it may difficult to properly prepare ultra high molecular weight polyolefin. To the contrary, if the amount of the molecular weight control agent is too large, polyolefin having higher molecular weight may be prepared, but catalytic activity may be lowered.

The above explained supported metallocene catalyst may be prepared by supporting a cocatalyst in a carrier, and additionally supporting the first and second metallocene compounds therein, and it may be prepared by selectively supporting the molecular weight control agent simultaneously with the first and second metallocene compounds, or before or after supporting the first and second metallocene compounds. The supporting method of each component follows common preparation process and conditions of supported metallocene catalysts, and the additional explanations thereof are omitted.

In a reactor including the above explained single supported metallocene catalyst or hybrid supported metallocene catalyst, and selectively, a molecular weight control agent, olefin monomers may be supplied to progress polymerization.

Wherein, according to one embodiment of the invention, olefin monomers may be supplied in the presence of hydrogen gas to progress polymerization.

Wherein, the hydrogen gas inhibits the rapid reaction of the metallocene catalyst at the initial stage of polymerization, and enables production of high molecular weight polyolefin in larger amount. Thus, due to the use of hydrogen gas, polyolefin having higher molecular weight and wide molecular weight distribution may be effectively obtained.

The hydrogen gas may be introduced in an amount such that the mole ratio of the hydrogen gas:olefin monomers becomes about 1:100 to 1:1,000. If the amount of hydrogen gas is too small, catalytic activity may not be sufficiently realized and thus it may be difficult to prepare polyolefin having desired molecular weight and molecular weight distribution, and if excessive amount of hydrogen is introduced, catalytic activity may not be sufficiently realized.

Meanwhile, in the reactor, on organic aluminum compound for removal of moisture in the reactor may be further introduced, and a polymerization reaction may be progressed in the presence of the same. Specific examples of the organic aluminum compound may include trialkylalunium, dialkyl aluminum halide, alkyl aluminum dihalide, aluminum dialkyl hydride or alkyl aluminum sesqui halide and the like, and more specific examples thereof may include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al (i-C_4H_9)_3$, $(C_2H_5)_2AlCl$, $(i-C_3H_9)_2AlCl$ or $(C_2H_5)_3Al_2Cl_3$ and the like. The organic aluminum compound may be continuously introduced into the reactor, and it may be introduced in the ratio of about 0.1 to 10 moles per 1 kg of reaction medium introduced in the reactor so as to appropriately remove moisture.

Meanwhile, in the preparation method of polyolefin of one embodiment, the olefin monomer may be ethylene, alpha-olefin, cyclic olefin, dien olefin or triene olefin having two or more double bonds.

Specific examples of the olefin monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene and the like, and two or more kinds of the onomers may be mixed and copolymerized.

One kind of olefin monomers may be homopolymerized or two or more kinds of monomers may be copolymerized using one continuous slurry polymerization reactor, loop slurry reactor, gas phase reactor or solution reactor.

The supported metallocene catalyst may be dissolved or diluted in aliphatic hydrocarbon solvents having a carbon number of 5 to 12, for example, pentane, hexane, heptanes, nonane, decane and isomers thereof, aromatic hydrocarbon solvents such as toluene, benzene, chlorine-substituted hydrocarbon solvents such as dichloromethane, chlorobenzene, and the like, and introduced. It is preferable that the solvent used is treated with a small amount of alkyl aluminum, thereby removing a small amount of water or air and the like, acting as a catalytic poison, and a cocatalyst may be further used.

The polyolefin obtained according to the preparation method of the above explained one embodiment may be high molecular weight or ultra high molecular weight polyolefin having weight average molecular weight of about 100,000 to about 2,000,000 g/mol, or about 400,000 to about 1,500,000 g/mol, and it may have molecular weight distribution (Mw/Mn) of about 2.0 to about 25, or about 2.2 to about 10, and thus have various molecular weight distributions.

And, the weight average molecular weight and the molecular weight distribution may be variously changed by controlling the kind and the content of the first and second metallocene compounds within the above explained range, the introduction amount of hydrogen gas, whether or not a molecular weight control agent is introduced, and the like, and are very useful for the preparation of polyolefin having desired properties. Namely, since the reactivities of the first and the second metallocene compounds to hydrogen and a molecular weight control agent are different, polyolefin having relatively low weight average molecular weight and narrow molecular weight distribution, polyolefin having low weight average molecular weight and wide molecular weight distribution, polyolefin having high weight average molecular weight and narrow molecular weight distribution, and polyolefin having high weight average molecular weight and wide molecular weight distribution within the above explained range may be prepared according to the selective combination of the metallocene compounds in one reactor, the introduction amount of hydrogen gas, and whether or not a molecular weight control agent is introduced.

And, the polyolefin prepared by the preparation method of the present invention has relatively wide molecular weight distribution and very high molecular weight, and yet, has a small amount of catalyst residue due to the properties of polyolefin prepare with a metallocene catalyst, and thus, the decomposition of polyolefin may be inhibited during a high temperature molding process.

Particularly, it may exhibit excellent properties due to high molecular weight, and may be very preferably used for large type blow molding products, next generation pipe products requiring excellent pressure resistance and heat resistance, or injection products having good stress crack resistance, and the like.

Hereinafter, the present invention will be explained in detail with reference to Examples. However, these examples may be modified in various forms, and the scope of the invention is not limited thereto.

EXAMPLE

Synthesis Example of a First Metallocene Compound

Synthesis Example 1

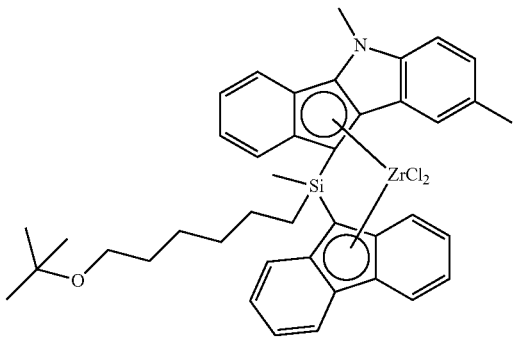

1-1 Preparation of a Ligand Compound 2 g of fluorene was dissolved in 5 mL MTBE, 100 mL hexane, 5.5 mL of n-BuLi, 2.5 M solution in hexane was added dropwise in a dry ice/acetone bath, and the solution was stirred at room temperature overnight. 3.6 g of (6-(tert-butoxy)hexyl)dichloro(methyl)silane was dissolved in 50 mL of hexane, the fluorene-Li slurry was transferred thereto for 30 minutes under a dry ice/acetone bath, and the solution was stirred at room temperature overnight. Simultaneously, 5,8-dimethyl-5,10-dihydroindeno[1,2-b]indole (12 mmol, 2.8 g) was also dissolved in 60 mL of THF, 5.5 mL of n-BuLi, 2.5 M solution in hexane was added dropwise in a dry ice/acetone bath, and the solution was stirred at room temperature overnight. The reaction solution of fluorene and (6-(tert-butoxy)hexyl)dichloro(methyl)silane was NMR-sampled to confirm the completion of the reaction, and then, the 5,8-dimethyl-5,10-dihydroindeno[1,2-b]indole-Li solution was transferred thereto under a dry ice/acetone bath. The solution was stirred at room temperature overnight. After the reaction, the solution was extracted with ether/water, and the remaining moisture of the organic layer was removed with $MgSO_4$ to obtain a ligand compound (Mw 597.90, 12 mmol), and it was confirmed through 1H-NMR that two isomers were produced.

$^1$H NMR (500 MHz, d6-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m)

1-2 Preparation of a metallocene compound 7.2 g (12 mmol) of the ligand compound synthesized in 1-1 was dissolved in 50 mL of diethylether 50 mL, 11.5 mL of n-BuLi, 2.5 M solution in hexane was added dropwise in a dry ice/acetone bath, and the solution was stirred at room temperature overnight. It was vacuum dried to obtain brown sticky oil. It was dissolved in toluene to obtain slurry. $ZrCl_4(THF)_2$ was prepared and 50 mL of toluene was added to prepare slurry. The 50 mL toluene slurry of $ZrCl_4(THF)_2$ was transferred in a dry ice/acetone bath. By stirring at room temperature overnight, it turned to violet. The reaction solution was filtered to remove LiCl. The filtrate was vacuum dried to remove toluene, and then, hexane was introduced and sonication was conducted for 1 hour. The slurry was filtered to obtain 6 g of filtered solid of a dark violet metallocene compound (Mw 758.02, 7.92 mmol, yield 66 mol %). Two isomers were observed on 1H-NMR.

$^1$H NMR (500 MHz, CDCl$_3$): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m)

Preparation Example of a Second Metallocene Compound

Synthesis Example 2

Preparation of (tBu-O—(CH$_2$)$_6$)(CH$_3$)Si(C$_5$(CH$_3$)$_4$)(tBu-N)TiCl$_2$ 50 g of Mg(s) was added to a 10 L reactor at room temperature, and then, 300 mL of THF was added thereto. About 0.5 g of I$_2$ was added, and then, the temperature of the reactor was maintained at 50° C. After the temperature of the reactor was stabilized, 250 g of 6-t-buthoxyhexyl chloride was added to the reactor at a speed of 5 mL/min using a feeding pump. It was observed that as 6-t-buthoxyhexyl chloride was added, the temperature of the reactor increased by about 4 to 5° C. While 6-t-buthoxyhexyl chloride was continuously added, the solution was stirred for 12 hours. After the reaction for 12 hours, a black reaction solution was obtained. 2 mL of the produced black solution was taken, water was added to obtain an organic layer, and 6-t-buthoxyhexane was confirmed by 1H-NMR. It could be seen from the 6-t-buthoxyhexane that a Grignard reaction progressed well. Thus, 6-t-buthoxyhexyl magnesium chloride was synthesized.

500 g of MeSiCl$_3$ and 1 L of THF were added to a reactor, and the reactor was cooled to −20° C. 560 g of the synthesized 6-t-buthoxyhexyl magnesium chloride was added to the reactor at a speed of 5 mL/min using a feeding pump. After the feeding of Grignard reagent was completed, the solution was stirred for 12 hours while slowly raising the temperature of the reactor to room temperature. After the reaction for 12 hours, it was confirmed that white MgCl$_2$ salt was produced. 4 L of hexane was added, and salt was removed through labdori to obtain a filtered solution. The obtained filtered solution was added to a reactor, and hexane was removed at 70° C. to obtain light yellow liquid. It was confirmed through 1H-NMR that the obtained liquid was desired methyl(6-t-buthoxy hexyl)dichlorosilane.

$^1$H-NMR (CDCl$_3$): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethylcyclopentadiene and 2.4 L of THF were added to a reactor, and then, the reactor was cooled to −20° C. 480 mL of n-BuLi was added to the reactor at a speed of 5 mL/min using a feeding pump. After n-BuLi was added, the solution was stirred for 12 hours while slowly raising the temperature of the reactor to room temperature. After reaction for 12 hours, an equivalent of methyl(6-t-buthoxy hexyl)dichlorosilane (326 g, 350 mL) was rapidly added to the reactor. The solution was stirred for 12 hours while slowly raising the temperature of the reactor to room temperature, and then, the reactor was cooled to 0° C. again, and 2 equivalents of t-BuNH$_2$ was added. While slowly raising the temperature of the reactor to room temperature, the solution was stirred for 12 hours. After reaction for 12 hours, THF was removed, 4 L of hexane was added, and salts were removed through Labdori to obtain a filtered solution. The filtered solution was added to the reactor again, and then, hexane was removed at 70° C. to obtain a yellow solution. It was confirmed through 1H-NMR that the obtained yellow solution is methyl(6-t-buthoxyhexyl)(tetramethylCpH)t-butylaminosilane).

To the dilithium salt of ligand of −78° C. synthesized from n-BuLi and ligand dimethyl(tetramethylCpH)t-butylaminosilane in a THF solution, TiCl$_3$(THF)$_3$ (10 mmol) was rapidly added. The reaction solution was stirred for 12 hours while slowly raising the temperature from −78° C. to room temperature. After stirring for 12 hours, an equivalent of PbCl$_2$(10 mmol) was added to the reaction solution at room temperature, and the solution was stirred for 12 hours. After stirring for 12 hours, a bluish black solution was obtained. THF was removed in the produced reaction solution, and then, hexane was added to filter the product. After removing hexane in the obtained filtered solution, it was confirmed through 1H-NMR that desired methyl(6-t-buthoxyhexyl)silyl(η5-tetramethylCp)(t-Butylamido)]TiCl$_2$ of tBu-O—(CH$_2$)$_6$)(CH$_3$)Si(C$_5$(CH$_3$)$_4$)(tBu-N)TiCl$_2$ was obtained.

1H-NMR (CDCl$_3$): 3.3 (s, 4H), 2.2 (s, 6H), 2.1 (s, 6H), 1.8~0.8 (m), 1.4 (s, 9H), 1.2 (s, 9H), 0.7 (s, 3H)

Synthesis Example 3

Preparation of (tert-Bu-O—(CH$_2$)$_6$)MeSi(9-C$_{13}$H$_{10}$)$_2$ZrCl$_2$ 1.0 mole of a tert-Bu-O—(CH$_2$)$_6$MgCl solution, a Grignard reagent, was obtained by the reaction of a tert-Bu-O—(CH$_2$)$_6$Cl compound and Mg(O) under THF solvent. The prepared Grignard reagent was added to a flask containing −30° C. MeSiCl$_3$ compound (176.1 mL, 1.5 mol) and THF (2.0 mL), the solution was stirred at room temperature for 8 hours or more, and the, the filtered solution was vacuum dried to obtain a tert-Bu-O—(CH$_2$)$_6$SiMeCl$_2$ (yield 92%).

Fluorene (3.33 g, 20 mmol), hexane (100 mL) and MTBE (methyl tert-butyl ether, 1.2 mL, 10 mmol) were introduced in a reactor at −20° C., 8 mL of n-BuLi (2.5M in Hexane) was slowly added, and the solution was stirred at room temperature for 6 hours. After the stirring was completed, the reactor was cooled to −30° C., and the prepared fluorenyl lithium solution was slowly added to a tert-Bu-O—(CH$_2$)$_6$SiMeCl$_2$ solution (2.7 g, 10 mmol) in hexane (100 mL) at −30° C. over 1 hour. After stirring at room temperature for 8 hours or more, water was added to extract, followed by evaporation to afford tert-Bu-O—(CH$_2$)$_6$MeSi(9-C$_{13}$H$_{10}$)$_2$ (5.3 g, yield 100%). The structure of the ligand was confirmed through 1H-NMR.

1H NMR (500 MHz, CDCl$_3$): −0.35 (MeSi, 3H, s), 0.26 (Si—CH2, 2H, m), 0.58 (CH2, 2H, m), 0.95 (CH2, 4H, m), 1.17 (tert-BuO, 9H, s), 1.29 (CH2, 2H, m), 3.21 (tert-BuO-CH2, 2H, t), 4.10 (Flu-9H, 2H, s), 7.25 (Flu-H, 4H, m), 7.35 (Flu-H, 4H, m), 7.40 (Flu-H, 4H, m), 7.85 (Flu-H, 4H, d).

At −20° C., to the (tert-Bu-O—(CH$_2$)$_6$)MeSi(9-C$_{13}$H$_{10}$)$_2$ (3.18 g, 6 mmol)/MTBE (20 mL) solution, 4.8 mL of n-BuLi (2.5M in Hexane) was slowly added, and while the temperature was raised to room temperature, the solution was reacted for 8 hours or more, and then, the dilithium salts slurry solution prepared at −20° C. was slowly added to the slurry solution of ZrCl$_4$(THF)$_2$ (2.26 g, 6 mmol)/hexane (20 mL), and the solution was additionally reacted for 8 hours. The precipitate was filtered and washed with hexane several times to obtain a (tert-Bu-O—(CH$_2$)$_6$)MeSi(9-C$_{13}$H$_{10}$)$_2$ZrCl$_2$ compound in the form of red solid (4.3 g, yield 94.5%).

$^1$H NMR (500 MHz, C6D6): 1.15 (tert-BuO, 9H, s), 1.26 (MeSi, 3H, s), 1.58 (Si—CH2, 2H, m), 1.66 (CH2, 4H, m), 1.91 (CH2, 4H, m), 3.32 (tert-BuO-CH2, 2H, t), 6.86

(Flu-H, 2H, t), 6.90 (Flu-H, 2H, t), 7.15 (Flu-H, 4H, m), 7.60 (Flu-H, 4H, dd), 7.64 (Flu-H, 2H, d), 7.77 (Flu-H, 2H, d)

Synthesis Example 4

Preparation of [tBu-O—(CH$_2$)$_6$—C$_5$H$_4$]$_2$ZrCl$_2$ t-Butyl-O—(CH$_2$)$_6$—Cl was prepared using 6-chlorohexanol by the method suggested in the document (Tetrahedron Lett. 2951 (1988)), and NaCp was reacted therewith to obtain t-Butyl-O—(CH$_2$)$_6$—C$_5$H$_5$ (yield 60%, b.p. 80° C./0.1 mmHg).

And, t-Butyl-O—(CH$_2$)$_6$—C$_5$H$_5$ was dissolved in THF at −78° C., n-BuLi was slowly added thereto, the temperature was raised to room temperature, and the solution was reacted for 8 hours. The synthesized lithium salt solution was slowly added to a suspension of ZrCl$_4$(THF)$_2$ (1.70 g, 4.50 mmol)/ THF (30 mL) at −78° C., and the solution was further reacted for 6 hours.

All volatile materials were vacuum dried, and a hexane solvent was added to the obtained oily liquid substance to filter. The filtered solution was vacuum dried, and then, hexane was added to induce precipitation at low temperature (−20° C.). The obtained precipitate was filtered at low temperature to obtain a white solid compound [tBu-O—(CH$_2$)$_6$—C$_5$H$_4$]$_2$ZrCl$_2$] (yield 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR (CDCl$_3$): 135.09, 116.66, 112.28, 72.42, 61.52, 30.66, 30.61, 30.14, 29.18, 27.58, 26.00.

Preparation Example of Supported Catalyst

Preparation Example 1

Into a glass reactor of room temperature, 100 mL of toluene was introduced and 10 g of dried silica was introduced, and then, the solution was stirred while raising the temperature of the reactor to 40° C. After sufficiently dispersing the silica, 60.6 mL of 10 wt % methylaluminoxane (MAO)/toluene solution was introduced, and the temperature was raised to 80° C., and then, the solution was stirred at 200 rpm for 16 hours. Thereafter, the temperature was lowered again to 40° C., followed by washing with a sufficient amount of toluene to remove unreacted aluminum compound. 100 mL of toluene was introduced again, and then, 0.5 mmol of the metallocene catalyst prepared in the Synthesis Example 1 was introduced, and the solution was stirred for 2 hours. After the reaction was completed, stirring was stopped and a toluene layer was separated and removed, followed by pressure reduction at 40° C. to remove toluene, thus preparing a supported catalyst.

Preparation Example 2

Into a glass reactor of room temperature, 100 mL of toluene was introduced and 10 g of dried silica was introduced, and then, the solution was stirred while raising the temperature of the reactor to 40° C. After sufficiently dispersing the silica, 60.6 mL of 10 wt % methylaluminoxane (MAO)/toluene solution was introduced, and the temperature was raised to 80° C., and then, the solution was stirred at 200 rpm for 16 hours. Thereafter, the temperature was lowered again to 40° C., followed by washing with a sufficient amount of toluene to remove unreacted aluminum compound. 100 mL of toluene was introduced again, and then, 0.5 mmol of the metallocene catalyst prepared in the Synthesis Example 1 was introduced, and the solution was stirred for 1 hour. And then, 0.5 mmol of the metallocene catalyst prepared in the Synthesis Example 2 was additionally introduced, and the solution was stirred for 2 hours. After the reaction was completed, stirring was stopped and a toluene layer was separated and removed, followed by pressure reduction at 40° C. to remove toluene, thus preparing a supported catalyst.

Preparation Example 3

A supported catalyst was prepared by the same method as Preparation Example 2, except that 0.5 mmol of the metallocene catalyst of Synthesis Example 3 was introduced instead of the metallocene catalyst of Synthesis Example 2.

Preparation Example 4

A supported catalyst was prepared by the same method as Preparation Example 2, except that 0.5 mmol of the metallocene catalyst of Synthesis Example 4 was introduced instead of the metallocene catalyst of Synthesis Example 2.

Preparation Example of a Molecular Weight Control Agent

Preparation Example 5

Into a 250 mL round bottom flask, 0.83 g of bis(cyclopentadienyl)-titanium dichloride and 50 mL of hexane were sequentially introduced, and then, the solution was stirred. 5 mL of triisobutylalunium (1M in hexane) was introduced therein, the solution was stirred at room temperature for 3 days, and then, the solvent was removed by vacuum to obtain a green mixture, which was a reduced state of titanium and was not oxidized or color-changed. Hereinafter, the green mixture was used as it is without purification.

1H NMR (CDCl3, 500 MHz): 6.3-6.6 (br m, 10H), 1.2-1.8 (br m, 4H), 0.8 (br s, 18H)

Ethylene Polymerization Example

Example 1

30 mg of the supported catalyst prepared in Preparation Example 1 was weighed in a dry box and put in a 50 mL glass bottle, and then, the bottle was sealed with a rubber diaphragm and taken out of the dry box to prepare a catalyst to be introduced. Polymerization was conducted in a 2 L metal alloy reactor that is equipped with a mechanical stirrer, is capable of controlling temperature and is used at high pressure.

Into the reactor, 1.2 L of hexane containing 1.0 mmol of triethylaluminum was introduced, the above prepared supported catalyst was introduced without air contact, and then, while simultaneously introducing gas ethylene monomers of pressure of 40 Kgf/cm$^2$ and based on the introduction amount of ethylene, 0.25 mol % of hydrogen at 80° C., polymerization was conducted for 1 hour. The polymerization was completed by stopping the reaction first and then exhausting ethylene to remove. The polymerization solvent was filtered to remove most of them, and then, the obtained polymer was dried in a vacuum oven at 80° C. for 4 hours.

Example 2

Ethylene polymerization was conducted by the same method as Example 1, except that based on the introduction amount of ethylene, 0.5 mol % of hydrogen was introduced together with ethylene to polymerize.

Example 3

Ethylene polymerization was conducted by the same method as Example 1, except that 30 mg of the supported catalyst of Preparation Example 2 was used instead of the supported catalyst prepared in Preparation Example 1.

Example 4

Ethylene polymerization was conducted by the same method as Example 1, except that 30 mg of the supported catalyst of Preparation Example 3 was used instead of the supported catalyst prepared in Preparation Example 1.

Example 5

Ethylene polymerization was conducted by the same method as Example 1, except that 30 mg of the supported catalyst of Preparation Example 4 was used instead of the supported catalyst prepared in Preparation Example 1.

Example 6

30 mg of the supported catalyst prepared in Preparation Example 2 was weighed in a dry box and put in a 50 mL glass bottle, and then, the bottle was sealed with a rubber diaphragm and taken out of the dry box to prepare a catalyst to be introduced. Polymerization was conducted in a 2 L metal alloy reactor that is equipped with a mechanical stirrer, is capable of controlling temperature and is used at high pressure.

Into the reactor, 1.2 L of hexane containing 1.0 mmol of triethylaluminum was introduced, and then, the molecular weight control agent of Preparation Example 5 was introduced in an amount such that it became 0.5 moles per one mole of aluminum without air contact. The above prepared supported catalyst was introduced without air contact, and then, while simultaneously introducing gas ethylene monomers of pressure of 40 Kgf/cm$^2$ and based on the introduction amount of ethylene, 0.25 mol % of hydrogen at 80° C., polymerization was conducted for 1 hour. The polymerization was completed by stopping the reaction first and then exhausting ethylene to remove. The polymerization solvent was filtered to remove most of them, and then, the obtained polymer was dried in a vacuum oven at 80° C. for 4 hours.

Example 7

Ethylene polymerization was conducted by the same method as Example 6, except that 30 mg of the supported catalyst of Preparation Example 3 was used instead of the supported catalyst of Preparation Example 2.

Example 8

Ethylene polymerization was conducted by the same method as Example 6, except that 30 mg of the supported catalyst of Preparation Example 4 was used instead of the supported catalyst of Preparation Example 2.

The polymerization conditions of Examples 1 to 8 are summarized in the following Table 1.

TABLE 1

| Example No. | Catalyst precursor | Hydrogen | Molecular weight control agent |
|---|---|---|---|
| Example 1 | Synthesis Example 1 | 0.25 mol % | — |
| Example 2 | Synthesis Example 1 | 0.5 mol % | — |
| Example 3 | Synthesis Example 1 + Synthesis Example 2 | 0.25 mol % | — |
| Example 4 | Synthesis Example 1 + Synthesis Example 3 | 0.25 mol % | — |
| Example 5 | Synthesis Example 1 + Synthesis Example 4 | 0.25 mol % | — |
| Example 6 | Synthesis Example 1 + Synthesis Example 2 | 0.25 mol % | 0.5 moles (per Al mole) |
| Example 7 | Synthesis Example 1 + Synthesis Example 3 | 0.25 mol % | 0.5 moles (per Al 1 mole) |
| Example 8 | Synthesis Example 1 + Synthesis Example 4 | 0.25 mol % | 0.5 moles (per Al 1 mole) |

And, the polymerization activity, weight average molecular weight and molecular weight distribution according to the polymerization of Examples 1 to 8 are shown in the following Table 2.

TABLE 2

| Example No. | Catalytic activity (KgPE/gCat.) | Weight average molecular weight (g/mol) | Molecular weight distribution (Mw/Mn) |
|---|---|---|---|
| Example 1 | 5.06 | 763,838 | 4.08 |
| Example 2 | 5.05 | 711,263 | 3.56 |
| Example 3 | 5.0 | 754,200 | 6.77 |
| Example 4 | 5.7 | 513,712 | 3.58 |
| Example 5 | 10.1 | 149,311 | 20.82 |
| Example 6 | 4.1 | 1,204,651 | 2.73 |
| Example 7 | 4.2 | 530,488 | 3.64 |
| Example 8 | 8.8 | 439,822 | 3.21 |

As can be seen from the Table 2, according to the preparation method of polyolefin of the present invention, polyolefin having various weight average molecular weights and molecular weight distributions could be prepared according to the combination of metallocene compounds, reactivity thereof to hydrogen, and interaction with a molecular weight control agent. Thus, it is expected that polyolefin having desired properties can be easily prepared according to specific combination of metallocene compounds, and selective use of hydrogen and a molecular weight control agent.

What is claimed is:
1. A method for preparing polyolefin comprising the step of polymerizing olefin monomers, in the presence of a supported metallocence catalyst wherein one or more kind of a first metallocene compound represented by the following Chemical Formula 1 and a cocatalyst are supported in a carrier, and hydrogen gas:

[Chemical Formula 1]

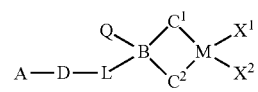

in the Chemical Formula 1,
A is hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

D is —O—, —S—, —N(R)— or —Si(R)(R')—, and R and R' are identical to or different from each other, and are each independently hydrogen, halogen, a C1 to C20 alkyl group, a C2 to C20 alkenyl group, or a C6 to C20 aryl group;

L is a C1 to C10 linear or branched alkylene group;

B is carbon, silicon or germanium;

Q is hydrogen, halogen, a C1 to C20 alkyl group, a C2 to C20 alkenyl group, a C6 to C20 aryl group, a C7 to C20 alkylaryl group, or a C7 to C20 arylalkyl group;

M is Group 4 transition metal;

$X^1$ and $X^2$ are identical to or different to each other, and are each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

$C^1$ and $C^2$ are identical to or different from each other, and are each independently represented by one of the following Chemical Formula 2a, Chemical Formula 2b or Chemical Formula 2c, provided that both $C^1$ and $C^2$ are not Chemical Formula 2c;

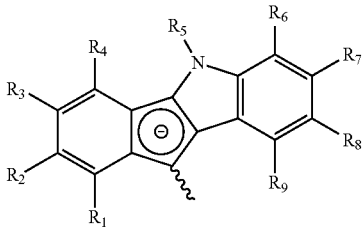

[Chemical Formula 2a]

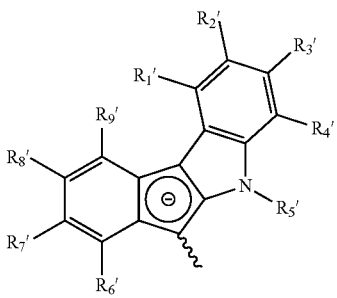

[Chemical Formula 2b]

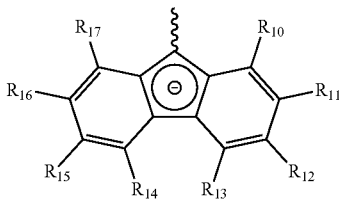

[Chemical Formula 2c]

in the Chemical Formula 2a, 2b and 2c,

R1 to R17 and R1' to R9' are identical to or different from each other, and are each independently hydrogen, halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylalkyl group, and two or more neighboring groups of R10 to R17 may be connected to each other to form a substituted or unsubstituted aliphatic or aromatic ring.

2. The method according to claim 1, wherein the supported metallocene catalyst further comprises one or more kind of a second metallocene compound selected from the compounds represented by the following Chemical Formulae 3 to 5:

$$(Cp^1R^a)_n(Cp^2R^b)M^1Z^1_{3-n}$$ [Chemical Formula 3]

in the Chemical Formula 3, $M^1$ is a Group 4 transition metal;

$Cp^1$ and $Cp^2$ are identical to or different from each other, and are each independently one selected from the group consisting of cyclopentadienyl, indenyl, 4,5,6,7-tetrahydro-1-indenyl, and fluorenyl radicals, which may be substituted with hydrocarbon having a carbon number of 1 to 20;

$R^a$ and $R^b$ are identical to or different from each other, and are each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^1$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

n is 1 or 0;

$$(Cp^3R^c)_mB^1(Cp^4R^d)M^2Z^2_{3-m}$$ [Chemical Formula 4]

in the Chemical Formula 4, $M^2$ is a Group 4 transition metal;

$Cp^3$ and $Cp^4$ are identical to or different from each other, and are each independently one selected from the group consisting of cyclopentadienyl, indenyl, 4,5,6,7-tetrahydro-1-indenyl, and fluorenyl radicals, which may be substituted with hydrocarbon having a carbon number of 1 to 20;

$R^c$ and $R^d$ are identical to or different from each other, and are each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^2$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

$B^1$ is one or more of carbon, germanium, silicon, phosphorus or nitrogen-containing radical, or a combination thereof, which crosslinks a $Cp^3R^c$ ring with a $Cp^4R^d$ ring, or crosslinks one $Cp^4R^d$ ring to $M^2$;

m is 1 or 0;

$$(Cp^5R^e)B^2(J)M^3Z^3_2$$ [Chemical Formula 5]

in the Chemical Formula 5, $M^3$ is a Group 4 transition metal;

$Cp^5$ is one selected from the group consisting of cyclopentadienyl, indenyl, 4,5,6,7-tetrahydro-1-indenyl and fluorenyl radicals, which may be substituted with hydrocarbon having a carbon number of 1 to 20;

$R^e$ is hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^3$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

$B^2$ is one or more of carbon, germanium, silicon, phosphorus or nitrogen-containing radical or a combination thereof, which crosslinks a $Cp^5R^e$ ring with J; and J is one selected from the group consisting of $NR^f$, O, $PR^f$ and S, wherein $R^f$ is $C_{1-20}$ alkyl, aryl, substituted alkyl, or substituted aryl.

3. The method according to claim 1, wherein the metallocene compound represented by the Chemical Formula 1 is selected from the group consisting of the following Structural Formulae:

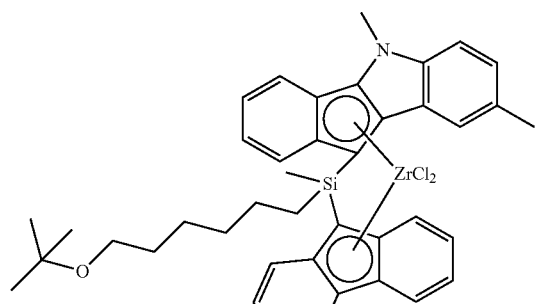

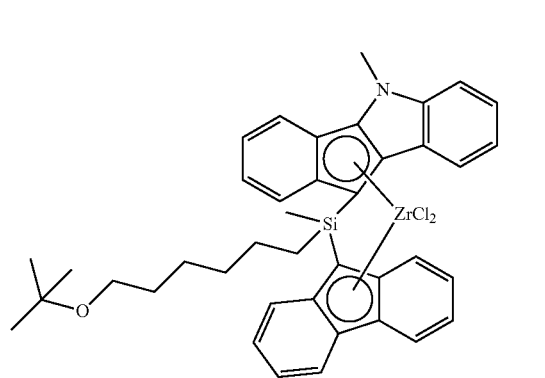

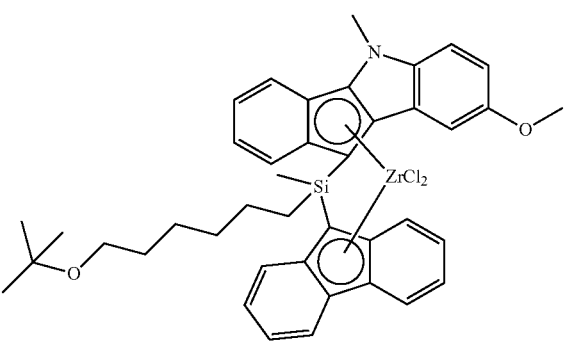

-continued

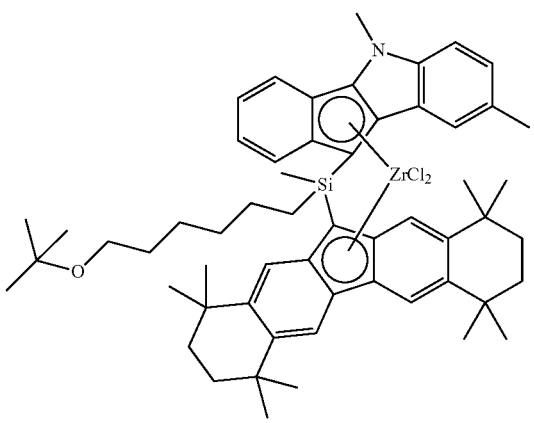

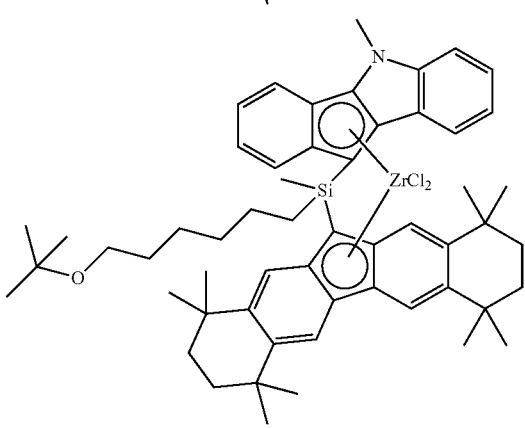

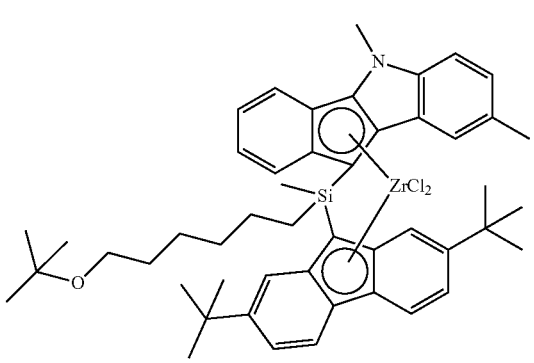

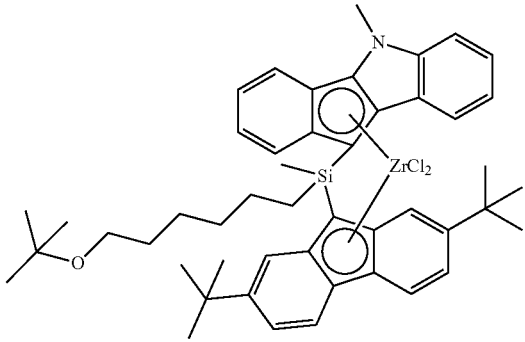

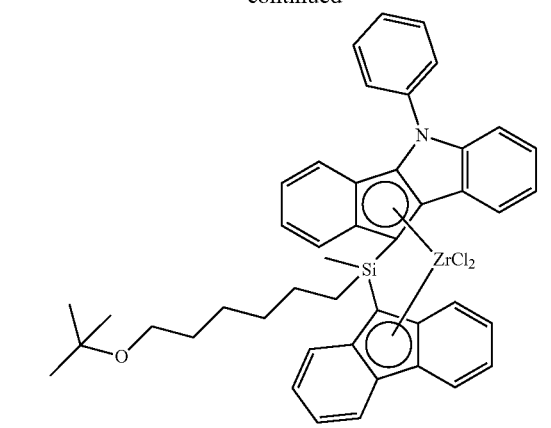
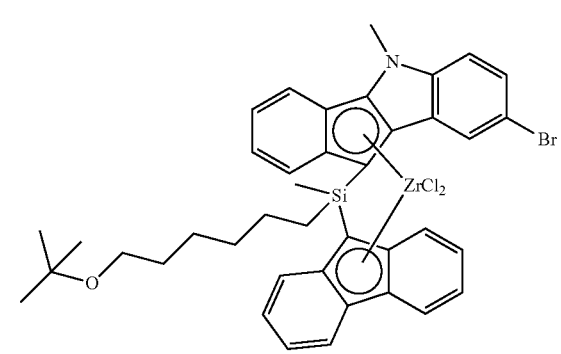
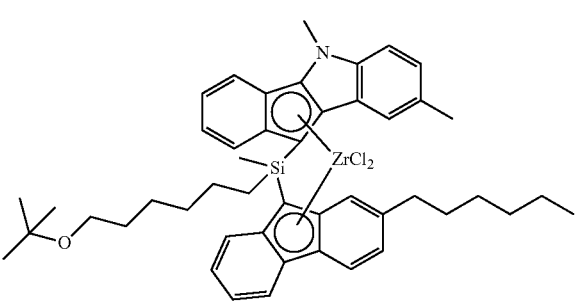
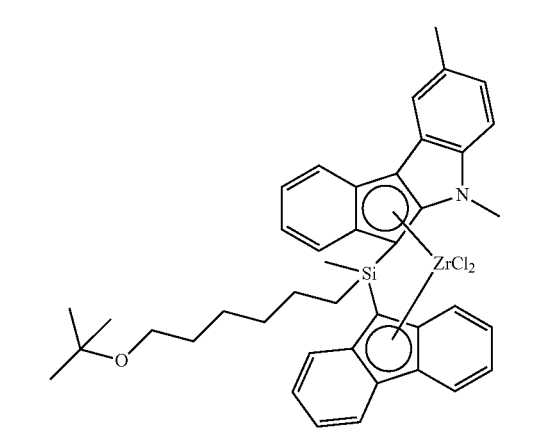
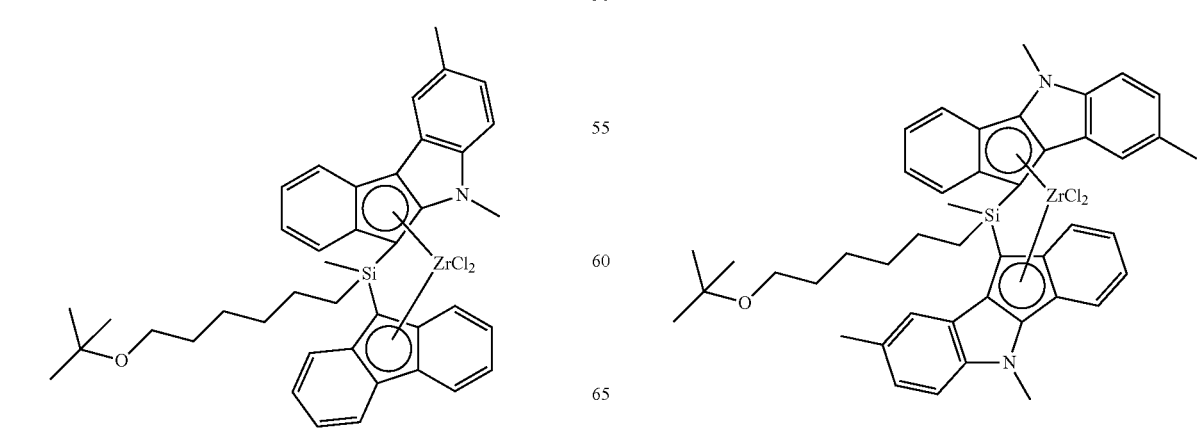

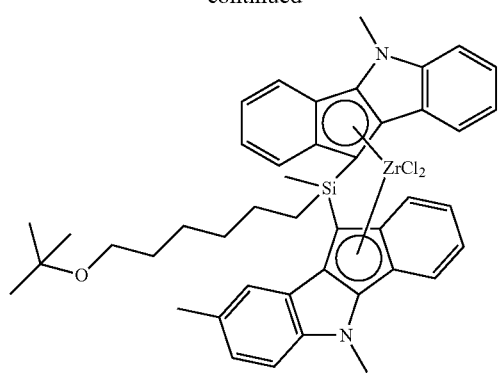
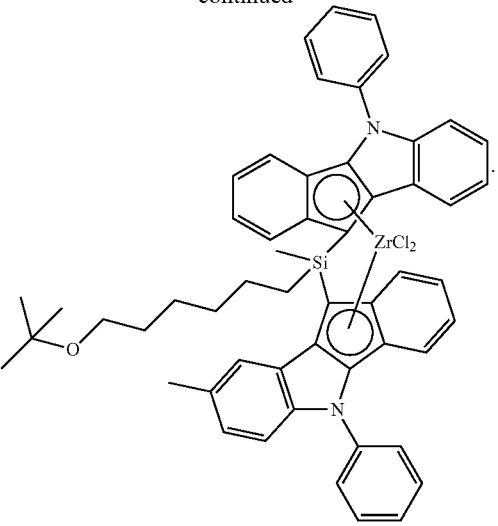
4. The method according to claim 2, wherein the second metallocene compound represented by the Chemical Formula 3 is selected from the group consisting of the following Structural Formulae:
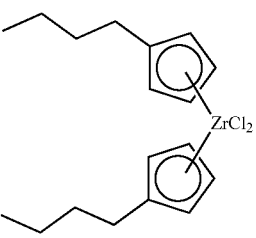
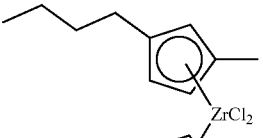
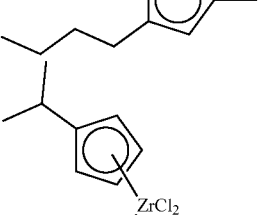
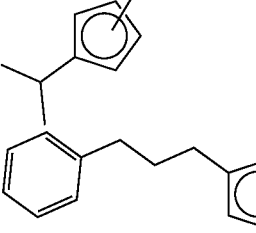
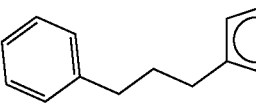
and

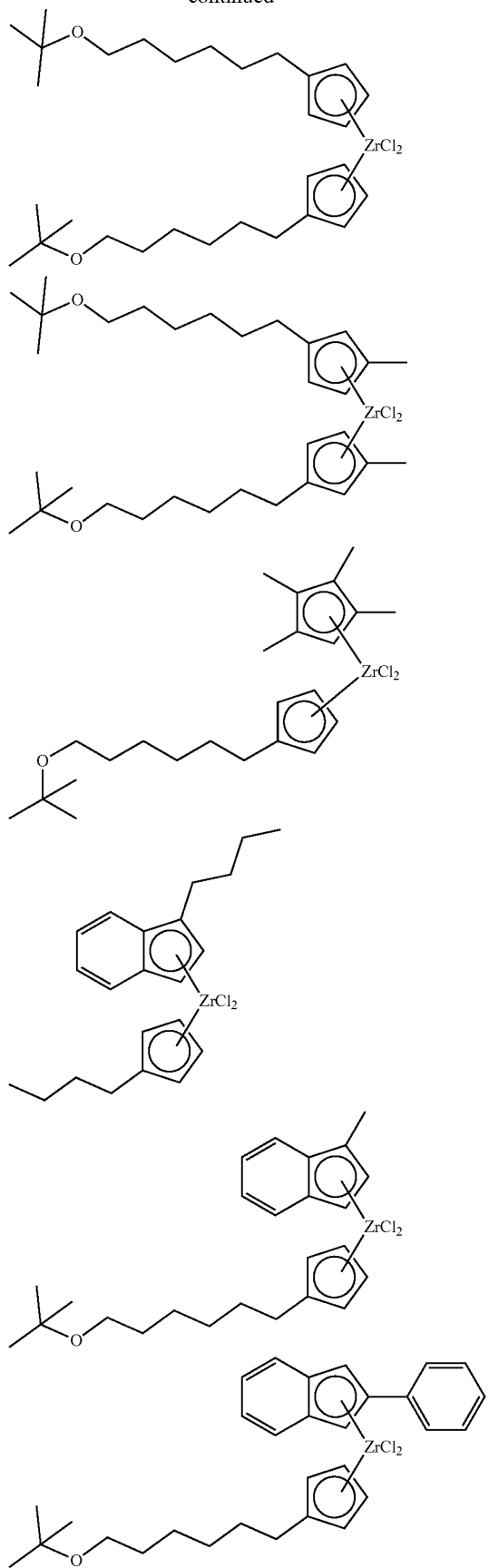
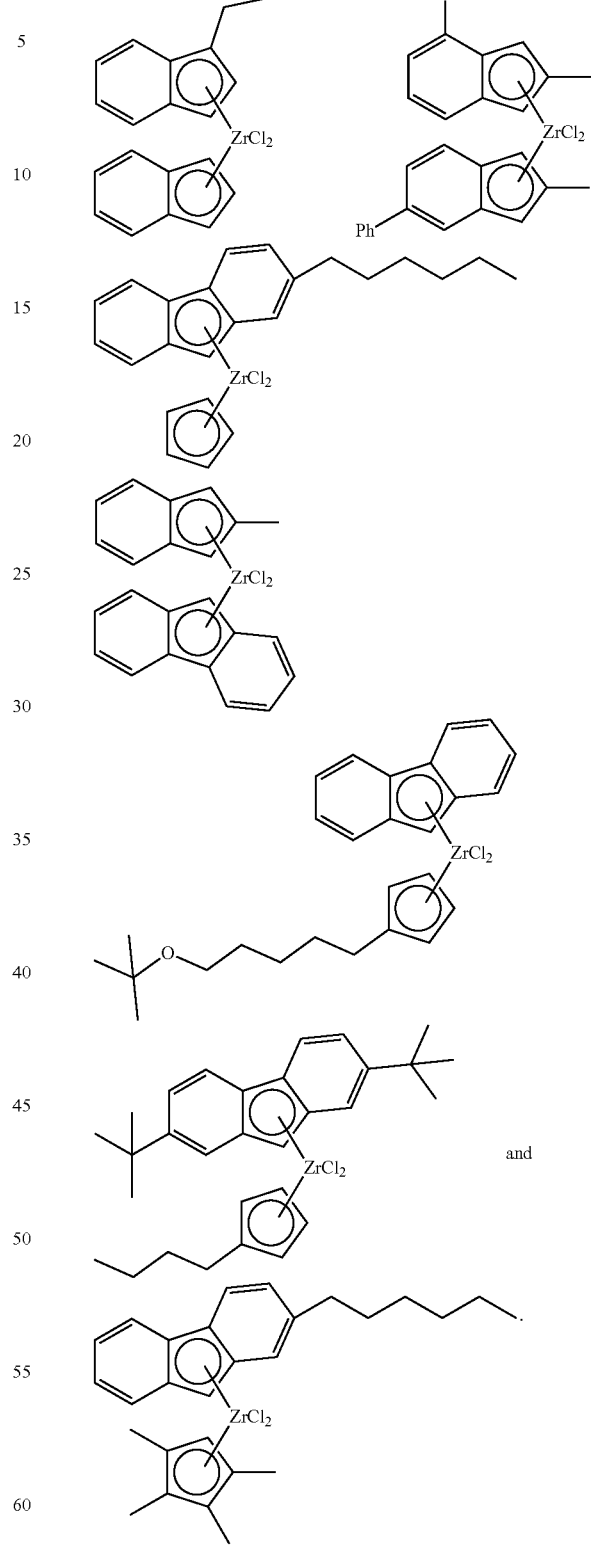
5. The method according to claim 2, wherein the second metallocene compound represented by the Chemical Formula 4 is selected from the group consisting of the following Structural Formulae:

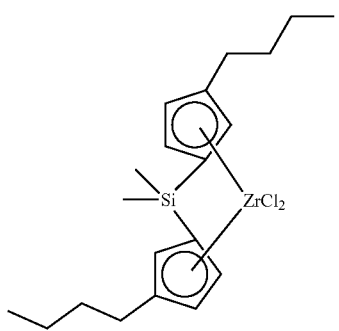
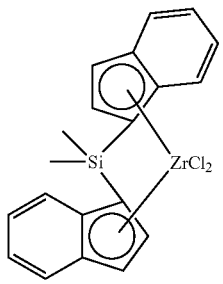
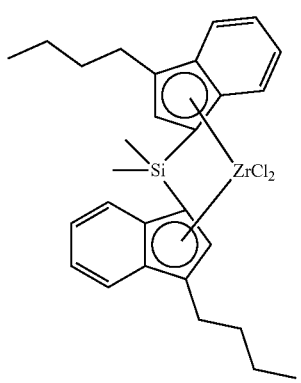
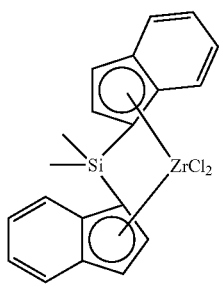
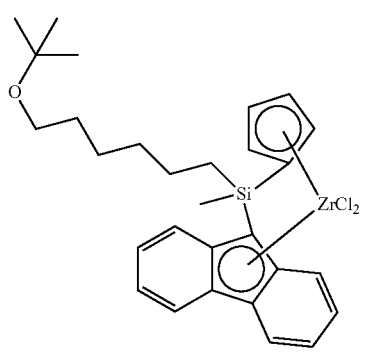
-continued
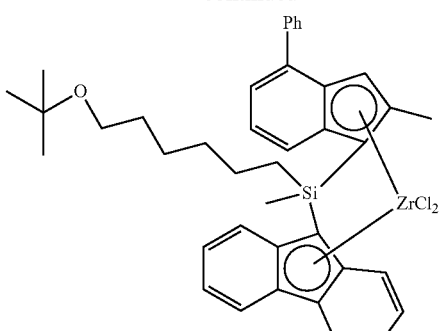
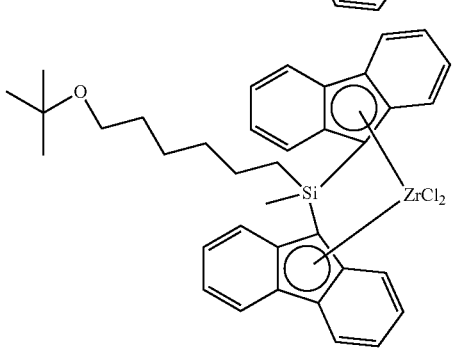
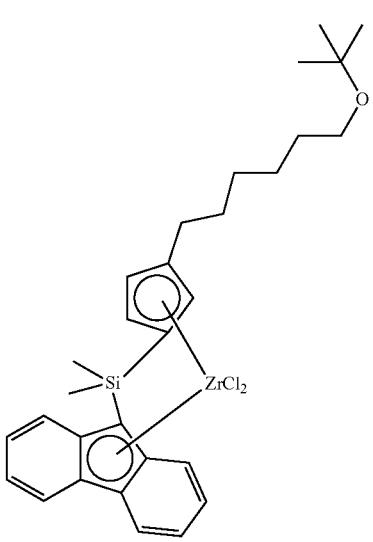
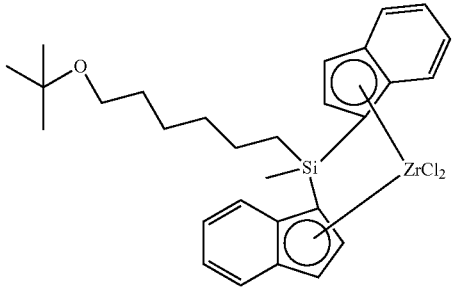

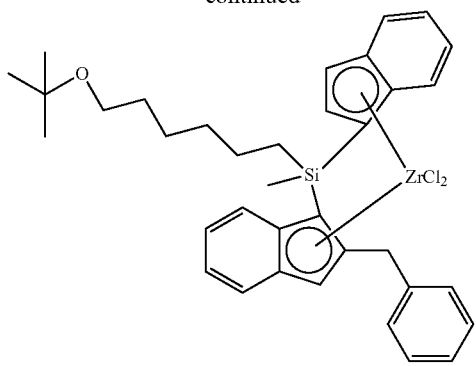
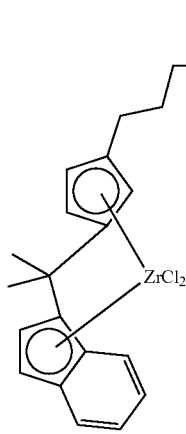
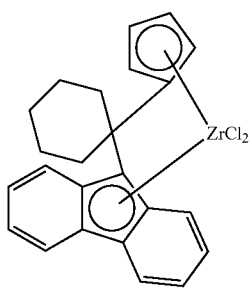
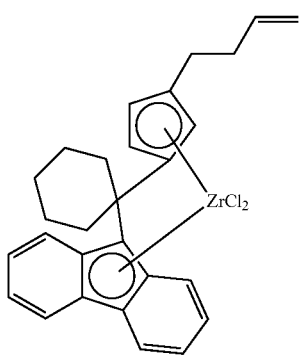
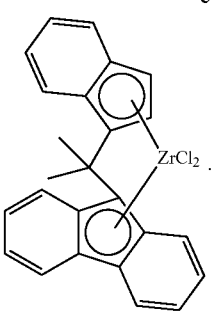
6. The method according to claim 2, wherein the second metallocene compound represented by the Chemical Formula 5 is selected from the group consisting of the following Structural Formulae:
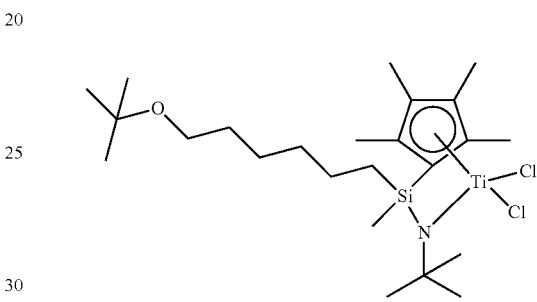
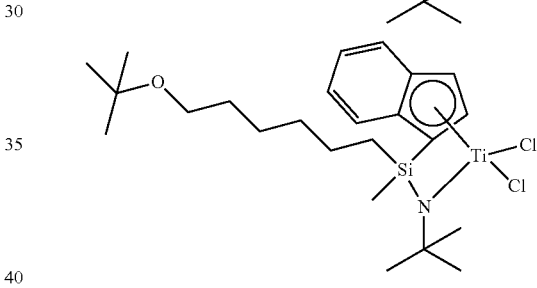
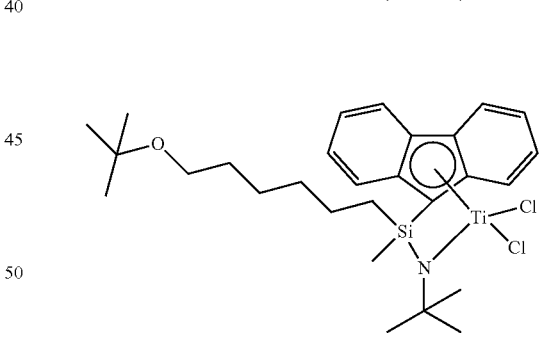
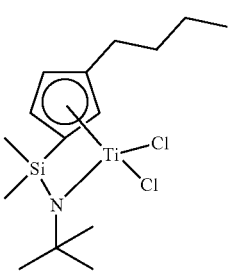

-continued

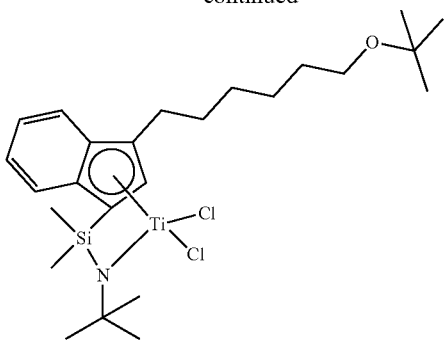

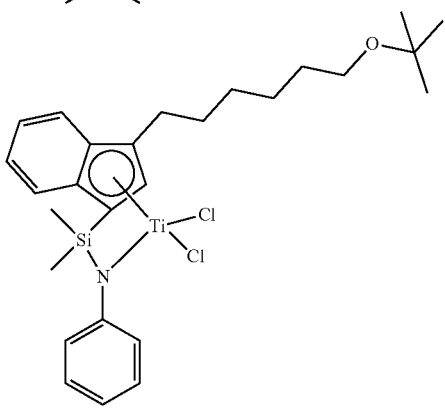

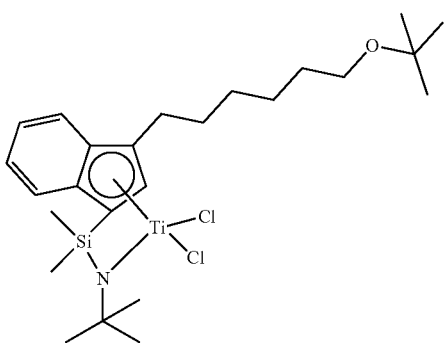

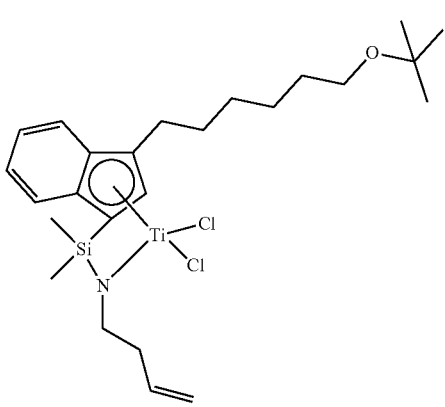

and

-continued

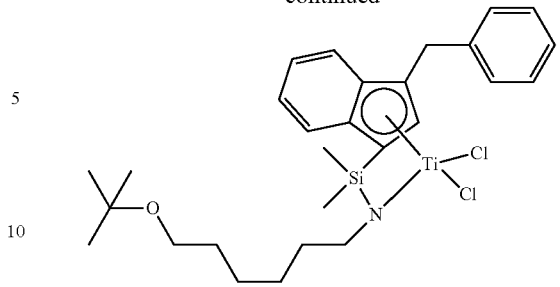

7. The method according to claim 1, wherein the carrier is selected form the group consisting of silica, silica-alumina and silica-magnesia.

8. The method according to claim 1, wherein the cocatalyst comprises an aluminum-containing first cocatalyst of the following Chemical Formula 6, and a borate-based second cocatalyst of the following Chemical Formula 7:

$$-[Al(R_{18})-O-]_k-$$ [Chemical Formula 6]

in the Chemical Formula 6, $R_{18}$ are each independently halogen, a C1-20 hydrocarbyl group unsubstituted or substituted by halogen, and k is an integer of 2 or more, $$T^+[BG_4]^-$$ [Chemical Formula 7]

in the Chemical Formula 7, $T^+$ is polyatomic ion having a valence of +1, B is boron in +3 oxidation state, and G's are each independently selected from the group consisting of hydride, dialkylamido, halide, alkoxide, aryloxide, hydrocarbyl, halocarbyl and halo-substituted hydrocarbyl, and G has 20 or less carbon, provided that G is halide in one or less position.

9. The method according to claim 1, wherein the olefin monomer comprises one or more kind of monomer selected from the group consisting of ethylene, propylene, 1-butene, 1-hexene, 1-octene, 1-pentene, 4-methyl-1-pentene, 1-hexene, 1-heptene, 1-decene, 1-undecene, 1-dodecene, norbornene, ethylidenenorbornene, styrene, alpha-methylstyrene and 3-chloromethylstyrene.

10. The method according to claim 1, wherein a molecular weight control agent is additionally introduced to polymerize olefin monomers.

11. The method according to claim 10, wherein the molecular weight control agent comprises a mixture or a reaction product of a cyclopentadienyl metal compound of the following Chemical Formula 8, and an organic aluminum compound of the following Chemical Formula 9:

$$Cp_4Cp_5M'X'_2$$ [Chemical Formula 8]

in the Chemical Formula 8,
$Cp_4$ and $Cp_5$ are each independently a ligand including a substituted or unsubstituted cyclopentadienyl group, a substituted or unsubstituted indenyl group, or a substituted or unsubstituted fluorenyl group, M' is a Group 4 transition metal, and X' is halogen;

$$R_dR_eR_fAl$$ [Chemical Formula 9]

in the Chemical Formula 9,
$R_d$, $R_e$ and $R_f$ are each independently a C4-20 alkyl group or halogen, and at least one of $R_d$, $R_e$ and $R_f$ is a C4-20 alkyl group.

12. The method according to claim 10, wherein the molecular weight control agent is used in an amount such that the mole ratio of the transition metals included in the first and second metallocene compounds: the molecular weight control agent becomes 1:0.1 to 1:2.

* * * * *